US007208727B2

(12) United States Patent
Fedorov et al.

(10) Patent No.: US 7,208,727 B2
(45) Date of Patent: Apr. 24, 2007

(54) ELECTROSPRAY SYSTEMS AND METHODS

(75) Inventors: Andrei G. Fedorov, Atlanta, GA (US); F. Levent Degertekin, Decatur, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 26 days.

(21) Appl. No.: 10/930,197

(22) Filed: Aug. 31, 2004

(65) Prior Publication Data

US 2005/0054208 A1 Mar. 10, 2005

Related U.S. Application Data

(63) Continuation-in-part of application No. 10/756,915, filed on Jan. 13, 2004.

(60) Provisional application No. 60/440,012, filed on Jan. 14, 2003, provisional application No. 60/499,547, filed on Sep. 2, 2003.

(51) Int. Cl.
*B01D 59/44* (2006.01)

(52) U.S. Cl. .................... 250/287; 250/286; 250/423 R

(58) Field of Classification Search ..................... None
See application file for complete search history.

(56) References Cited

U.S. PATENT DOCUMENTS

| | | | | |
|---|---|---|---|---|
| 3,683,212 | A | 8/1972 | Zoltan | 310/8.3 |
| 3,997,113 | A * | 12/1976 | Pennebaker, Jr. | 239/708 |
| 5,306,412 | A * | 4/1994 | Whitehouse et al. | 204/452 |
| 5,945,678 | A * | 8/1999 | Yanagisawa | 250/423 F |
| 6,787,763 | B2 * | 9/2004 | De La Mora et al. | 250/287 |
| 6,797,945 | B2 * | 9/2004 | Berggren et al. | 250/288 |
| 2001/0013579 | A1 * | 8/2001 | Andrien et al. | 250/423 R |
| 2002/0168297 | A1 * | 11/2002 | Shvets et al. | 422/100 |
| 2005/0045833 | A1 * | 3/2005 | Fischer et al. | 250/423 P |
| 2005/0153344 | A1 * | 7/2005 | Diamond et al. | 435/6 |
| 2005/0199824 | A1 * | 9/2005 | Yamada et al. | 250/425 |

OTHER PUBLICATIONS

Barber, et al.; Fast-atom-bombardment mass spectra of enkephalins; The Biochemical Society; 1981; vol. 197; pp. 401-404.
Barber, et al.; Fast atom Bombardment of Solids (F.A.B.): A New Ion Source For Mass Spectrometry; J.C.S. Chem. Comm., 1981; pp. 325-327.
Martin Bell; Taylor Cones and Electrosprays: a potential technique for creating new monodisperse colloids; The 1998 NSF REU summer program at Ohio State University Dept. of Physics; pp. 1-8.
Berggren, et al.; Single-Pulse Nanoelectrospray Ionization; Anal. Chem. 2002; vol. 74, No. 14; pp. 3443-3448.
Bings, et al.; Microfluidic Devices Connected to Fused-Silica Capillaries with Minimal Dead Volume; Anal. Chm.; 199; vol. 71; pp. 3292-3296.

(Continued)

*Primary Examiner*—Nikita Wells
*Assistant Examiner*—Anthony Quash
(74) *Attorney, Agent, or Firm*—Thomas, Kayden, Horstemeyer & Risley LLP

(57) ABSTRACT

Electrospray systems, electrospray structures, removable electrospray structures, methods of operating electrospray systems, and methods of fabricating electrospray systems, are disclosed.

30 Claims, 13 Drawing Sheets

OTHER PUBLICATIONS

Chen, et al.; A new method for significantly reducing drop radius without reducing nozzle radius in drop-on-demand drop production; Physics of Fluids; vol. 14, No. 1; Jan., 2002; pp. L1-L4.
Frank Vanhaecke; Detection by ICP-Mass Spectrometry; Handbook of Elemental Speciation; Techniques and Methodology; 2003; pp. 281-312.
Heij, et al.; Characterisation of a fL droplet generator for inhalation drug therapy; Sensors and Actuators 85; 2000; pp. 430-434.
Desai, et al.; A MEMS Electrospray Nozzle for Mass Spectroscopy; Transducers '97; 1997 International Conference on Solid-State Sensors and Actuators; Chicago, Jun. 16-19, 1997; pp. 927-930.
Dole, et al.; Molecular Beams of Macroions; The Journal of Chemical Physics; vol. 49, No. 5; Sep. 1, 1968; pp. 2240-2249.
Feng, et al.; A Simple Nanoelectrospray Arrangement With Controllable Flowrate for Mass Analysis of Submicroliter Protein Samples; J AM Soc Mass Spectrom 2000; vol. 11; pp. 94-99.
French, et al.; Monodisperse Dried Microparticulate Injector for Analytical Instrumentation; Anal. Chem. 1994; vol. 66, No. 5; pp. 685-691.
Simon J. Gaskell; Electrospray: Principles and Practice; Journal of Mass Spectrometry; vol. 32; 1997; pp. 677-688.
Hager, et al.; Behavior fo Microscopic Liquid Drolets near A Strong Electrostatic Field: Droplet Electrospray; Ana. Chem. 1994; vol. 66, No. 9; May 1, 1994; pp. 1593-1594.
Hager, et al.; Droplet Electrospray Mass Spectrometry; Anl. Chem. 1994; vol. 66, No. 22; Nov. 15, 1994; pp. 3944-3949.
He, et al.; 337 nm Matrix-assisted Laser Desorption/Ionization fo Single Aerosol Particles; J. Mass Spectrom.; 1999; vol. 34; p. 909-914.
Iribarne, et al.; On the evaporation of small ions from charged droplets; J. Chem. Phys., vol. 64, No. 6, Mar. 15, 1976; pp. 2287-2294.
De Juan et al.; Charge and Size Distributions of Electrospray Drops; Journal of Colliod and Interface Science; vol. 186; 1997; pp. 280-293.
Kirlew, et al.; An evaluation of ultrasonic nebulizers as interfaces for capillary electrophoresis of inorganic anions and cations with inductively coupled plasma mass spectrometric detection; Spectrochimica Acta Part B 53; 1998; pp. 221-237.
Li, et al.; Transport, Manipulation and Reaction of Biological Cells On-Chip Using Electrokinetic Effects; Anal. Chem; 1997; vol. 69, No. 8; Apr. 15, 1 997; pp. 1564-1568.
Li, et al.; Integration of Microfabricated Devices to Capillary Electrophoresis-Electrospray Mass Spectrometry Using a Low Dead Volume Connection: Application to Rapid Analyses of Proteolytic Digests; Anal. Chem. 1994; vol. 71, No. 15; Aug. 1, 1999; pp. 3036-3045.
Li, et al.; Separation and Identification of Peptides from Gel-Isolated Membrane Proteins Using a Microfabricated Device for Combined Capillary Electrophoresis/Nanoelectrospray Mass Spectrometry; Anal. Chem. 2000; vol. 72, No. 3, Feb. 1, 2000; pp. 599-609.
Licklider, et al.; A Micromachined Chip-Based Electrospray Source for Mass Spectrometry; Anal. Chm. 200; vol. 72, No. 2, Jan. 15, 2000; pp. 367-375.
Percin, et al.; Micromachined droplet ejector arrays; Review of Scientific Instruments; vol. 73, No. 12, Dec. 2002; pp. 4385-4389.
Percin, et al.; Micromachined droplet ejector arrays for controlled ink-jet printing and deposition; Review of Scientific Instruments; vol. 73, No. 5; May 2002; pp. 2193-2196.
Percin, et al.; Piezoelectrically actuated flextensional micromachined ultrasound tranducers; Ultrasonics 40; 2002; pp. 441-448.
Percin, et al.; Piezoelectric droplet ejector for ink-jet printing of fluids and solid particles; Review of Scientific Instruments; vol. 74, No. 2; Feb. 2003; pp. 1120-1127.
Ramsey, et al.; Generating Electrospray from Microchip DevicesUsing Electroosmotic Pumping; Anal. Chem. 1997; vol. 69, No. 6, Mar. 15, 1997; pp. 1174-1178.
Schultz, et al.; A Fully Integrated Monolithic Microchip Electrospray Device for Mass Spectrometry; Anal. Chem. 2000; vol. 72, No. 17, Sep. 1, 2000; pp. 4058-5063.
Gary L. Switzer; A versatile system for stable generation of uniform droplets; Review of Scientific Instruments; vol. 62, No. 11, Nov. 1999, pp. 2765-2771.
Wang, et al.; Polymer-Based Electrospray Chips for Mass Spectrometry; IEEE; 1999; pp. 523-528.
Wilm, et al.; Analytical Properties of the Nanoelectrospray Ion Source; Analytical Chemistry; vol. 68, No. 1; Jan. 1, 1996; pp. 1-8.

* cited by examiner

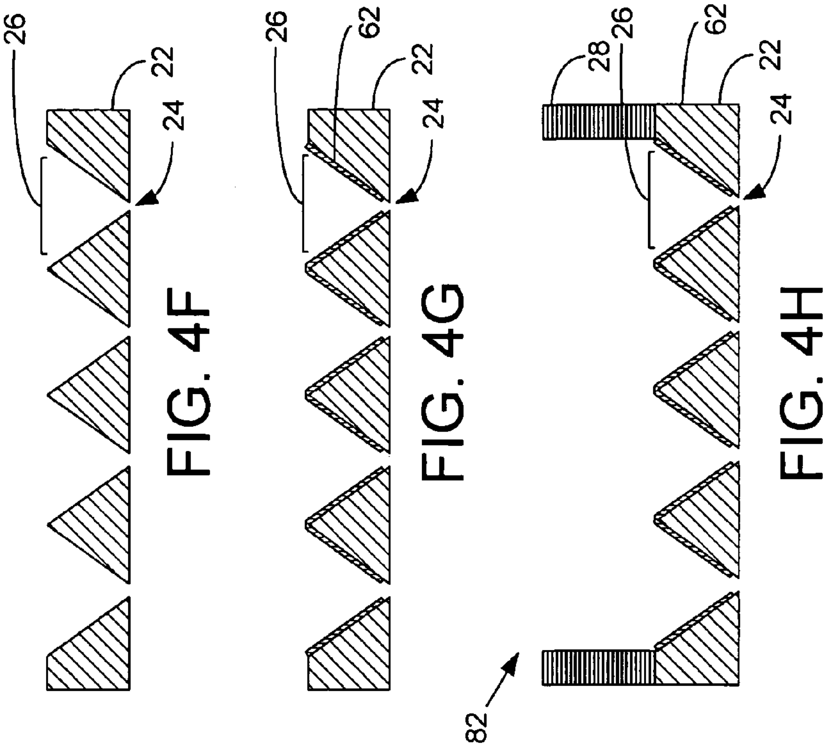
26
22
24
FIG. 4F
26
62
22
24
FIG. 4G
28
26
62
22
24
82
FIG. 4H
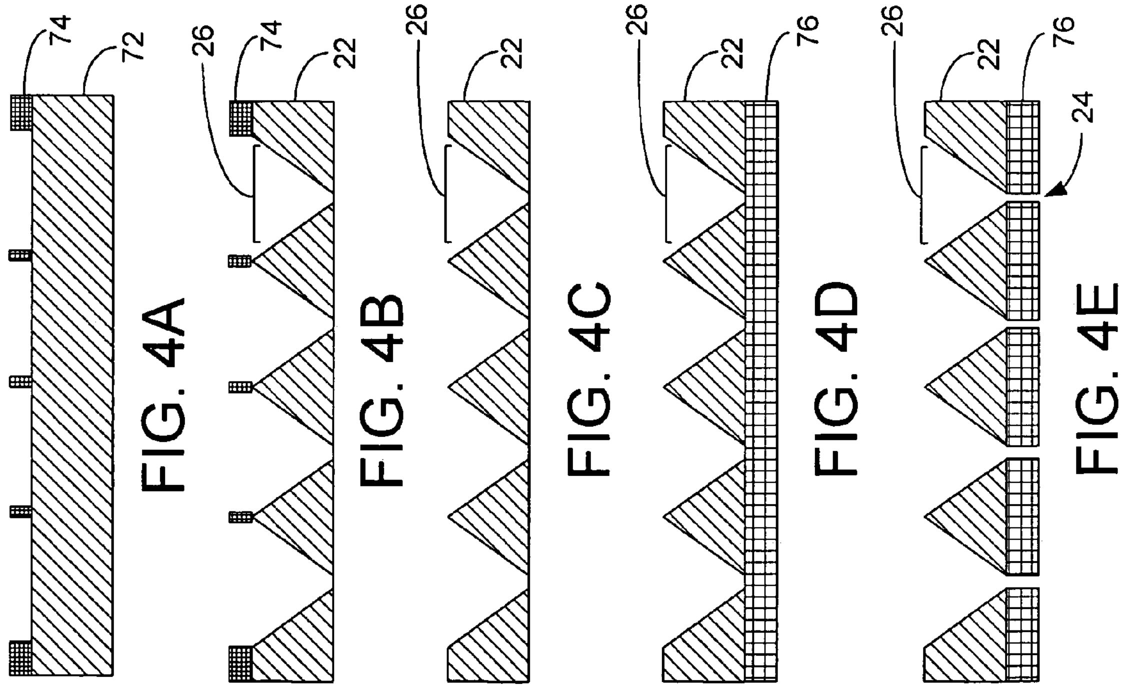
74
72
FIG. 4A
26
74
22
FIG. 4B
26
22
FIG. 4C
26
22
76
FIG. 4D
26
22
76
24
FIG. 4E

ELECTROSPRAY SYSTEMS AND METHODS

CROSS-REFERENCE TO RELATED APPLICATIONS

This application is a continuation-in-part application, which claims priority to copending U.S. Utility patent application Ser. No. 10/756,915 entitled "INTEGRATED MICRO FUEL PROCESSOR AND FLOW DELIVERY INFRASTRUCTURE" filed on Jan. 13, 2004, which claims priority to U.S. Provisional Patent Application Ser. No. 60/440,012, entitled "INTEGRATED MICRO FUEL PROCESSOR FOR HYDROGEN PRODUCTION AND PORTABLE POWER GENERATION" filed on Jan. 14, 2003, the entirety of which is hereby incorporated by reference. In addition, this application claims priority to U.S. Provisional Patent Application Ser. No. 60/499,547, entitled "Piezoelectrically Driven Micromachined Electrospray Source for Mass Spectroscopy" filed on Sep. 2, 2003, the entirety of which is hereby incorporated by reference.

FIELD OF THE DISCLOSURE

The present disclosure relates generally to ionization systems, and relates more particularly, to electrospray systems and methods.

BACKGROUND

As reflected in the recent Proteomics special feature article ("Automated NanoElectrospray: A New Advance for Proteomics Researchers", *Laboratory News*, 2002) Mass Spectrometry (MS) has become the technology of choice to meet today's unprecedented demand for accurate bioanalytical measurements, including protein identification. Although MS can be used to analyze biomolecules with very large molecular weights (up to several MegaDaltons (Mda)), these molecules must be first converted to gas-phase ions before they can be introduced into a mass spectrometer for analysis. Electrospray ionization (ESI) has proven to be an enormous breakthrough in structural biology because it provides a mechanism for transferring large biological molecules into the gas phase as intact charged ions. It is the creation of efficient conversion of a very small quantity of a liquid charged ions. It is the creation of efficient conversion of a very small quantity of a liquid sample (proteins are very expensive and often very difficult to produce in sizable quantities) into gas-phase ions that is one of the main bottlenecks for using mass spectrometry in high throughput proteomics.

Conventional (micro and nano) capillary ESI sources, as well as the more recently developed MEMS-based electrospray devices, rely on application of strong electric field, which is used for focusing of the charged jet leading to jet tip instabilities and formation of small droplets of the analyte sample. As a result, the size and homogeneity of the formed droplets is determined by the magnitude and geometry of the applied electric field, thus requiring high voltages for generating sufficiently small micrometer or sub-micrometer droplets via the so-called Taylor cone nebulization. Reliance on the electrohydrodynamic Taylor cone focusing of the jet to form the mist of sufficiently small charged droplets leading to single ion formation imposes several fundamental and significant limitations on the capabilities of the conventional ESI interface.

On such problem is that a very large electric potential needs to be applied to the capillary tip (up to a few kilovolts relative to the ground electrode of the MS interface) to ensure formation of the stable Taylor cone, especially at higher flow rates and with poorly conducting organic solvents.

An additional problem is that the choice of suitable solvents is very much restricted to those featuring high electrical conductivity and sufficiently low surface tension. This restriction imposes severe limitations on the range of biological molecules that can be analyzed via ESI Mass Spectrometry. For example, use of pure water (the most natural environment for most biomolecules) as a solvent is difficult in conventional ESI since the required onset electrospray voltage is greater than that of the corona discharge, leading to an unstable Taylor cone, damage to the emitter and uncontrollable droplet/ion formation.

Since the conventional ESI relies on the disintegration of the continuous jet emanating from the Taylor cone into an aerosol of charged droplets, there is the limit to the lowest flow rate (and therefore the minimum sample size) that can be used during the analysis. For example, commercial products require the minimum sample volume to be about 3 μL.

Another problem is that sample utilization (i.e., fraction of the sample volume that is introduced and being used in MS analysis relative to the total volume of the electrosprayed sample) is very low due to uncontrollable nature of electrohydrodynamic atomization process that relies on the surface instabilities. Further, a significant dead volume (i.e., a fraction of the sample that cannot be pulled from the capillary by electrical forces) is unavoidable in any jet-based atomization process.

Still other problems are that commercially available ESI devices are very expensive because of the manufacturing difficulties, and have a limited usable lifetime because of the high voltage operation in a chemically-aggressive solvent environment.

Accordingly, an electrospray system is desired that addresses at least some of the problems of existing technologies.

SUMMARY

Briefly described, embodiments of this disclosure, among others, include electrospray systems, electrospray structures, removable electrospray structures, methods of operating electrospray systems, and methods of fabricating electrospray systems. One exemplary electrospray system, among others, includes: a first reservoir configured to store a first fluid including a first ionizable molecule; a first actuator disposed in communication with the first reservoir configured to generate an ultrasonic pressure wave through the first fluid; an ionization source configured to ionize the first ionizable molecule to form a ionized first molecule; and a first set of ejector structures including at least one ejector nozzle configured to eject the first fluid in response to the ultrasonic pressure wave, wherein each ejector structure is configured to focus the ultrasonic pressure wave at a tip of the ejector nozzle, and wherein the first reservoir is disposed between the first actuator and the first set of ejector structures. The first actuator and the ionization source are configured to form a plurality of ionized first molecules from the first fluid, where the ionized first molecules are ejected from the ejector nozzles of the first set of ejector structures upon activation of the first actuator and the ionization source.

One exemplary removable electrospray structure, among others, includes: a first reservoir; an ionization source; and a first set of ejector structures including at least one ejector nozzle, wherein each ejector structure is configured to focus an ultrasonic pressure wave at a tip of the ejector nozzle. The removable electrospray structure is adapted to reversibly couple with a first actuator, where the first actuator is positioned in communication with the first reservoir. Upon activation of the first actuator and upon activation of the ionization source a first fluid including a plurality of ionized first molecules disposed in the first reservoir are ejected from the ejector nozzle of the first set of ejector structures.

One exemplary removable electrospray structure, among others, includes: a first reservoir; an ionization source disposed in fluidic communication with the first fluid; and a first set of ejector structures adjacent the first reservoir, wherein the first set of ejector structures include at least one ejector nozzle, wherein each ejector structure is configured to focus an ultrasonic pressure wave at a tip of the ejector nozzle.

One exemplary method, among others, includes: providing an electrospray system as described above; ionizing the first molecule in the first fluid to produce the first ionized molecule; activating the first actuator to generate the ultrasonic pressure wave for forcing the first fluid through the ejector nozzle; and ejecting the first fluid including the first ionized molecule through the ejector nozzle.

One exemplary method of fabricating an electrospray structure, among others, includes: providing a structure; forming a first set of ejector structures within the structure, the first set of ejector structures including at least one ejector nozzle configured to eject a first fluid in response to the ultrasonic pressure wave, wherein each ejector structure is configured to focus the ultrasonic pressure wave at a tip of the ejector nozzle; and disposing a first actuator on the structure, wherein a first space between the first actuator and the first set of ejector structures forms a first reservoir, wherein the first actuator is in communication with the first reservoir, wherein the actuator is configured to generate an ultrasonic pressure wave through a first reservoir. A first ionization source is disposed on a surface selected from an inside wall of the ejector nozzle adjacent the first reservoir, the first actuator adjacent the first reservoir, and combinations thereof.

Other apparatuses, systems, methods, features, and advantages of this disclosure will be or become apparent to one with skill in the art upon examination of the following drawings and detailed description. It is intended that all such additional apparatuses, systems, methods, features, and advantages be included within this description, be within the scope of this disclosure, and be protected by the accompanying claims.

BRIEF DESCRIPTION OF THE DRAWINGS

Further aspects of the present disclosure will be more readily appreciated upon review of the detailed description of its various embodiments, described below, when taken in conjunction with the accompanying drawings.

FIGS. 4A through 4J are illustrations of cross-sections of a representative embodiment of a method of forming the electrospray system shown in FIG. 3.

FIG. 9B illustrates an acoustically responsive fluid bubble in one section of the electrospray system, while FIG. 9C illustrates a fluid bubble in the other section of the electrospray system.

FIGS. 10B through 10F illustrate an acoustically responsive fluid bubble being positioned from one section of the electrospray system to another.

DETAILED DESCRIPTION

Mass spectrometry systems, methods of use thereof, electrospray systems, methods of use thereof, and methods of fabrication thereof, are disclosed. The mass spectrometry systems can be operated in a high throughput (parallel) and/or a multiplexed (individually controlled) mode. The mass spectrometry systems described herein include embodiments of electrospray systems that are capable of independently forming a fluid aerosol (i.e., droplets) and ionizing the molecules present in the fluid. The droplets are formed by producing resonant ultrasonic waves (e.g., acoustical pressure waves) within a reservoir interfaced with a structure having shaped cavities (e.g., acoustic horns) that focus the ultrasonic waves and thus amplify the pressure and form a pressure gradient at an ejector nozzle for each shaped cavity. The high pressure gradient close to the ejector nozzle accelerates fluid droplets of size comparable to the ejector nozzle diameter (e.g., a few micrometers) out of the ejector nozzle, which are thus controllably generated (e.g., ejected) during every cycle of the drive signal (e.g., a sinusoidal signal) after an initial transient. In other words, the droplets are produced either discretely (e.g., drop-on-demand), or as a continuous jet-based approach.

Decoupling of the droplet generation and the molecular ionization reduces the energy required to ionize the molecules and also lowers the sample size required, minimizes the dead volume, and improves sample utilization. In addition, decoupling of the droplet generation and the molecular ionization enables the electrospray system to produce droplets including ionized molecules at low voltages (e.g., about 80 to a few hundred Volts (V)), in contrast to commonly used electrospray systems (e.g., 1 kV to several kV). In addition, relatively small volumes of fluids (e.g., about 100 nanoliters (nL) to a few hundred nL) can be used in contrast to commonly used electrospray systems (e.g., 3 μL or more).

Embodiments of the electrospray system can be used in a continuous flow online operation (e.g., continuous loading of samples) and/or in discrete off-line operation. In discrete off-line operation, embodiments of the electrospray system can include a disposable nozzle system (e.g., array of nozzle systems that can include one or more samples and standards) that can be charged with one or more fluids and inserted into the electrospray system. The disposable nozzle system can be removed and replaced with another disposable nozzle system.

Additional embodiments of the electrospray system can be used in a high throughput electrospray system (e.g., simultaneous use of nozzles) and/or in a multiplexed electrospray system (e.g., using an array of individually addressable nozzles or individually addressable groups of nozzles). Details describing each of these embodiments are described in more detail below.

Figure 1:
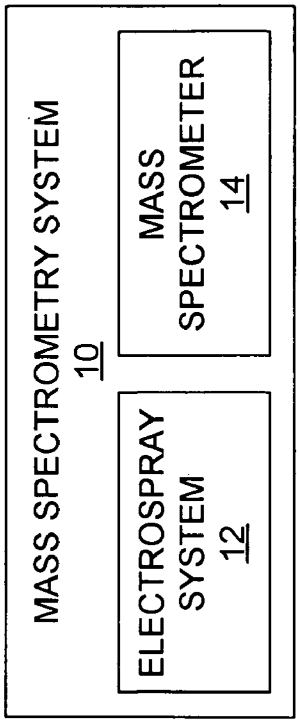
FIG. 1 is a schematic of a representative embodiment of a mass spectrometry system.

FIG. 1 is a schematic of a representative embodiment of a mass spectrometry system 10. The mass spectrometry system 10 includes an electrospray system 12 and a mass spectrometer 14. The electrospray system 12 is interfaced with the mass spectrometer 14 so that the fluid sample (e.g., in the form of droplets) is communicated from the electrospray system 12 to the mass spectrometer system 14 using electrostatic lenses and the like under one or more different vacuum pressures. In addition, the electrospray system 12 can be also interfaced with a liquid chromatography system, a fluidic system for selective delivery of different samples, and automated fluid charging system such as a pump, for example.

The mass spectrometer 14 can include, but is not limited to, a mass analyzer and an ion detector. The mass analyzer can include, but is not limited to, a time-of-flight (TOF) mass analyzer, an ion trap mass analyzer (IT-MS), a quadrupole (Q) mass analyzer, a magnetic sector mass analyzer, or an ion cyclotron resonance (ICR) mass analyzer. In some embodiments, because it can be used to separate ions having very high masses, the mass analyzer is a TOF mass analyzer.

The ion detector is a device for recording the number of ions that are subjected to an arrival time or position in a mass spectrometry system 25, as is known by one skilled in the art. Ion detectors can include, for example, a microchannel plate multiplier detector, an electron multiplier detector, or a combination thereof. In addition, the mass spectrometry system 10 includes vacuum system components and electronic system components, as are known by one skilled in the art.

In general, the electrospray system 12 is capable of independently forming a fluid aerosol (i.e., droplets) and ionizing the molecules present in the fluid. The ionized molecules are then mass analyzed by the mass spectrometer 14, which can provide information about the types of molecules present in the fluid sample.

Figure 2:
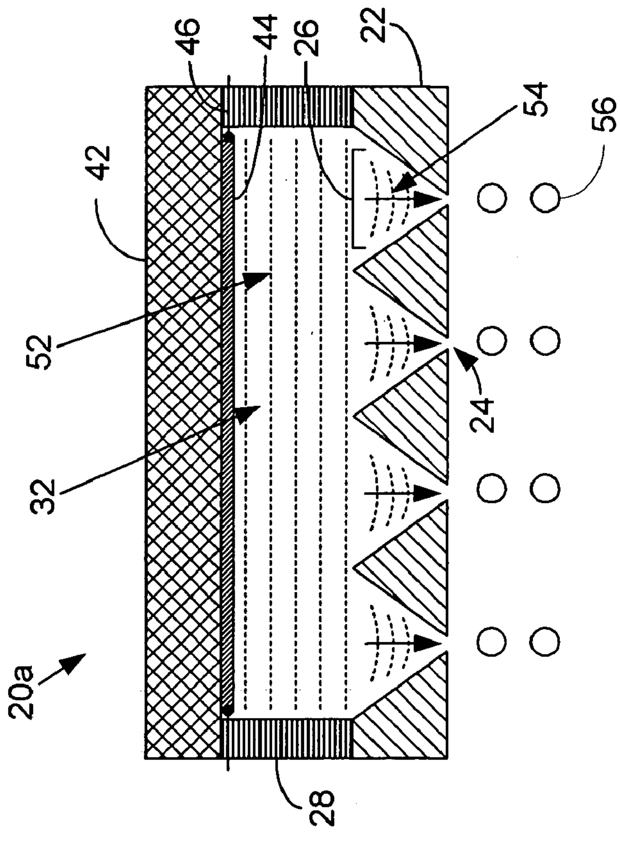
FIG. 2 is an illustration of a cross-section of an embodiment of an electrospray system, as shown in FIG. 1.

FIG. 2 is an illustration of a cross-section of an embodiment of an electrospray system **20*a*, as shown in FIG. 1. The electrospray system 20*a* includes, but is not limited to, an array structure 22 including ejector structures 26, a separating layer 28, a reservoir 32, an actuator 42, and an ionization source 44. A fluid can be disposed in the reservoir 32 and in the array 22 of ejector structures 26. Upon actuation of the actuator 42, a resonant ultrasonic wave 52 can be produced within the reservoir 32 and fluid. The resonant ultrasonic wave 52 couples to and transmits through the liquid and is focused by the ejector structures 26 to form a pressure gradient 54 within the ejector structure 26. The high-pressure gradient 54 accelerates fluid out of the ejector structure 26 to produce droplets 56. The cycle of the drive signal applied to the actuator 42** dictates, at least in part, the rate at which the droplets are discretely produced.

A drop-on-demand ejection can be achieved by modulation of the actuation signal in time domain. The actuator 42 generating ultrasonic waves can be excited by a finite duration signal with a number of sinusoidal cycles (a tone burst) at the desired frequency. Since a certain energy level is reached for droplet ejection, during the initial cycles of this signal, the standing acoustic wave pattern in the resonant cavity is established and the energy level is brought up to the ejection threshold. The number of cycles required to achieve the threshold depends on the amplitude of the signal input to the wave generation device and the quality factor of the cavity resonance. After the threshold is reached, one or more droplets can be ejected in a controlled manner by reducing the input signal amplitude after the desired number cycles. This signal can be used repetitively, to eject a large number of droplets. Another useful feature of this operation is to reduce the thermal effects of the ejection, since the device can cool off when the actuator 42 is turned off between consecutive ejections. The ejection speed and droplet size can also be controlled by the amplitude and duration of the input signal applied to the actuator 42.

The array structure 22 can include, but is not limited to, an ejector nozzle 24 and an ejector structure 26. In general, the material that the array structure 22 is made of has substantially higher acoustic impedance as compared to the fluid. The array structure 22 can be made of materials such as, but not limited to, single crystal silicon (e.g., oriented in the (100), (010), or (001) direction), metals (e.g., aluminum, copper, and/or brass), plastics, silicon oxide, silicone nitride, and combinations thereof;

The ejector structure 26 can have a shape such as, but not limited to, conical, pyramidal, or horn-shaped with different cross-sections. In general, the cross-sectional area is decreasing (e.g., linear, exponential, or some other functional form) from a base of the ejector nozzle 26 (broadest point adjacent the reservoir 32) to the ejector nozzle 24. The cross sections can include, but are not limited to, a triangular cross-section (as depicted in FIG. 2), and exponentially narrowing. In an embodiment, the ejector structure 26 is a pyramidal shape.

The ejector structure 26 has acoustic wave focusing properties in order to establish a highly-localized, pressure maximum substantially close to the ejector nozzle 24. This results in a large pressure gradient at the ejector nozzle 24 since there is effectively an acoustic pressure release surface at the ejector nozzle 24. Since the acoustic velocity is related to the pressure gradient through Euler's relation, a significant momentum is transferred to the fluid volume close to the ejector nozzle 24 during each cycle of the acoustic wave in the ejector structure 26. When the energy coupled by the acoustic wave in the fluid volume is substantially larger than the restoring energy due to surface tension, viscous friction, and other sources, the fluid surface is raised from its equilibrium position. Furthermore, the frequency of the waves should be such that there is enough time for the droplet to break away from the surface due to instabilities.

The ejector structure 26 has a diameter (at the base) of about 50 micrometers to 5 millimeters, 300 micrometers to 1 millimeter, and 600 micrometers to 900 micrometers. The distance (height) from the ejector nozzle 24 to the broadest point in the ejector structure 26 is from about 20 micrometers to 4 millimeters, 200 micrometers to 1 millimeter, and 400 micrometers to 600 micrometers.

The ejector nozzle 24 size effectively determines the droplet size and the amount of pressure focusing along with the ejector structure 26 geometry (i.e., cavity geometry). The ejector nozzle 24 can be formed using various micromachining techniques as described below and can have a shape such as, but not limited to, circular, elliptic, rectangular, and rhombic. The ejector nozzle 24 has a diameter of about 50 nanometers to 50 micrometers, 200 nanometers to 30 micrometers, and 1 micrometer to 10 micrometers.

In one embodiment all of the ejector nozzles are positioned inline with a mass spectrometer inlet, while in another embodiment only select ejector nozzles (1 or more) are positioned inline with the mass spectrometer inlet.

The array structure 22 can include one ejector nozzle 24 (not shown), a (one-dimensional) array of ejector nozzles 24, or a (two dimensional) matrix of parallel arrays of ejector nozzles 24. As shown in FIG. 2, the ejector structure 26 can include one ejector nozzle 24 each or include a plurality of ejector nozzles 24 in a single ejector structure 26.

The separating layer 28 is disposed between the array structure 22 and the actuator 46. The separating layer 28 can be fabricated of a material such as, but not limited to, silicon, metal, and plastic. The separating layer 28 is from about 50 micrometers to 5 millimeters in height (i.e., the distance from the actuator 42 to the array structure 22), from about 200 micrometers to 3 millimeters in height, and from about 500 micrometers to 1 millimeter in height.

The reservoir 32 is substantially defined by the separating layer 28, the array structure 22, and the actuator 42. In general, the reservoir 32 and the ejector structures 26 include the fluid. The reservoir 32 is an open area connected to the open area of the ejector structures 26 so that fluid flows between both areas. In addition, the reservoir 32 can also be in fluidic communication (not shown) with a liquid chromatography system or other microfluidic structures capable of flowing fluid into the reservoir 32.

In general, the dimensions of the reservoir 32 and the ejector structure 26 can be selected to excite a cavity resonance in the electrospray system at a desired frequency. The structures may have cavity resonances of about 100 kHz to 100 MHz, depending, in part, on fluid type and dimensions and cavity shape, when excited by the actuator 42.

The dimensions of the reservoir 32 are from 100 micrometers to 4 centimeters in width, 100 micrometers to 4 centimeters in length, and 100 nanometers to 5 centimeters in height. In addition, the dimensions of the reservoir 32 are from 100 micrometers to 2 centimeters in width, 100 micrometers to 2 centimeters in length, and 1 micrometer to 3 millimeter in height. Further, the dimensions of the reservoir 32 are from 200 micrometers to 1 centimeters in width, 200 micrometers to 1 centimeters in length, and 100 micrometers to 2 millimeters in height.

The fluid can include liquids having low ultrasonic attenuation (e.g., featuring energy loss less than 0.1 dB/cm around 1 MHz operation frequency). The fluid can be liquids such as, but not limited to, water, methanol, dielectric fluorocarbon fluid, organic solvent, other liquids having a low ultrasonic attenuation, and combinations thereof The fluids can include one or more molecules that can be solvated and ionized. The molecules can include, but are not limited to, polynucleotides, polypeptides, and combinations thereof The actuator 42 produces a resonant ultrasonic wave 52 within the reservoir 32 and fluid. As mentioned above, the resonant ultrasonic wave 52 couples to and transmits through the liquid and is focused by the ejector structures 26 to form a pressure gradient 54 within the ejector structure 26. The high-pressure gradient 54 accelerates fluid out of the ejector structure 26 to produce droplets. The droplets are produced discretely in a drop-on-demand manner. The frequency in which the droplet are formed is a function of the drive cycle applied to the actuator 42 as well as the fluid, reservoir 32, ejector structure 26, and the ejector nozzle 24.

An alternating voltage is applied (not shown) to the actuator 42 to cause the actuator 42 to produce the resonant ultrasonic wave 52. The actuator 42 can operate at about 100 kHz to 100 MHz, 500 kHz to 15 MHz, and 800 kHz to 5 MHz A direct current (DC) bias voltage can also be applied to the actuator 42 in addition to the alternating voltage. In embodiments where the actuator 42 is piezoelectric, this bias voltage can be used to prevent depolarization of the actuator 42 and also to generate an optimum ambient pressure in the reservoir 32. In embodiments where the actuator 42 is electrostatic, the bias voltage is needed for efficient and linear operation of the actuator 42. Operation of the actuator 42 is optimized within these frequency ranges in order to match the cavity resonances, and depends on the dimensions of and the materials used for fabrication of the reservoirs 32 and the array structure 22 as well the acoustic properties of the fluids inside the ejector.

The actuator 42 can include, but is not limited to, a piezoelectric actuator and a capacitive actuator. The piezoelectric actuator and the capacitive actuator are described in X. C. Jin, I. Ladabaum, F. L. Degertekin, S. Calmes and B. T. Khuri-Yakub, "Fabrication and Characterization of Surface Micromachined Capacitive Ultrasonic Immersion Transducers", IEEE/ASME Journal of Microelectromechanical Systems, 8, pp. 100–114, 1999 and Meacham, J. M., Ejimofor, C., Kumar, S., Degertekin F. L., and Fedorov, A., A micromachined ultrasonic droplet generator based on liquid horn structure, *Rev. Sci. Instrum.*, 75 (5), 1347–1352 (2004)., which are incorporated herein by reference.

The dimensions of the actuator 42 depend on the type of actuator used. For embodiments where the actuator 42 is a piezoelectric actuator, the thickness of the actuator 42 is determined, at least in part, by the frequency of operation and the type of the piezoelectric material. The thickness of the piezoelectric actuator is chosen such that the thickness of the actuator 42 is about half the wavelength of longitudinal waves in the piezoelectric material at the frequency of operation. Therefore, in case of a piezoelectric actuator, the dimensions of the actuator 42 are from 100 micrometers to 4 centimeters in width, 10 micrometers to 1 centimeter in thickness, and 100 micrometers to 4 centimeters in length. In addition, the dimensions of the actuator 42 are from 100 micrometers to 2 centimeters in width, 10 micrometers to 5 millimeters in thickness, and 100 micrometers to 2 centimeters in length. Further, the dimensions of the actuator 42 are from 100 micrometers to 1 centimeters in width, 10 micrometers to 2 millimeters in thickness, and 100 micrometers to 1 centimeters in length.

In embodiments where the actuator 42 is an electrostatic actuator, the actuator 42 is built on a wafer made of silicon, glass, quartz, or other substrates suitable for microfabrication, where these substrates determine the thickness of the actuator 42. Therefore, in case of a microfabricated electrostatic actuator, the dimensions of the actuator 42 are from 100 micrometers to 4 centimeters in width, 10 micrometers to 2 millimeter in thickness, and 100 micrometers to 4 centimeters in length. In addition, the dimensions of the actuator 42 are from 100 micrometers to 2 centimeters in width, 10 micrometers to 1 millimeter in thickness, and 100 micrometers to 2 centimeters in length. Further, the dimensions of the actuator 42 are from 100 micrometers to 1 centimeters in width, 10 micrometers to 600 micrometers in thickness, and 100 micrometers to 1 centimeter in length.

In the embodiment illustrated in FIG. 2, the ionization source 44 is disposed on the surface of the actuator 42 adjacent the reservoir 32. A direct current bias voltage can be applied to the ionization source 44 via one or more sources through line 46. The voltage applied to the ionization source 44 is substantially lower than that applied in currently used electrospray systems. The voltage applied to the ionization source 44 should be sufficient enough to cause charge separation to ionize the molecules present in the fluid. In this regard, the voltage applied to the ionization source 44 should be capable to produce redox reactions within the fluid. Therefore, the voltage applied to the ionization source 44 will depend, at least in part, upon the fluid and molecules present in the fluid. The voltage applied to the ionization source depends, in part, on the electrochemical redox potential of the given sample analyte and is typically from about 0 to ±1000 V, ±20 to ±600V, and ±80 to ±300V.

The ionization source 44 can include, but is not limited to, a wire electrode, a conductive material disposed on the reservoir 32, and an electrode of the actuator 42, and combinations thereof The material that the wire and/or the conductive material is made of can include, but is not limited to, metal (e.g., copper, gold, and/or platinum), conductive polymers, and combinations thereof The ionization source 44 may cover a small fraction (1%) or an entire surface (100%) of the actuator 42. The ionization source 44 has a thickness of about 1 nanometer to 100 micrometers, 10 nanometers to 10 micrometers, and 100 nanometers to 1 micrometer.

Figure 3:
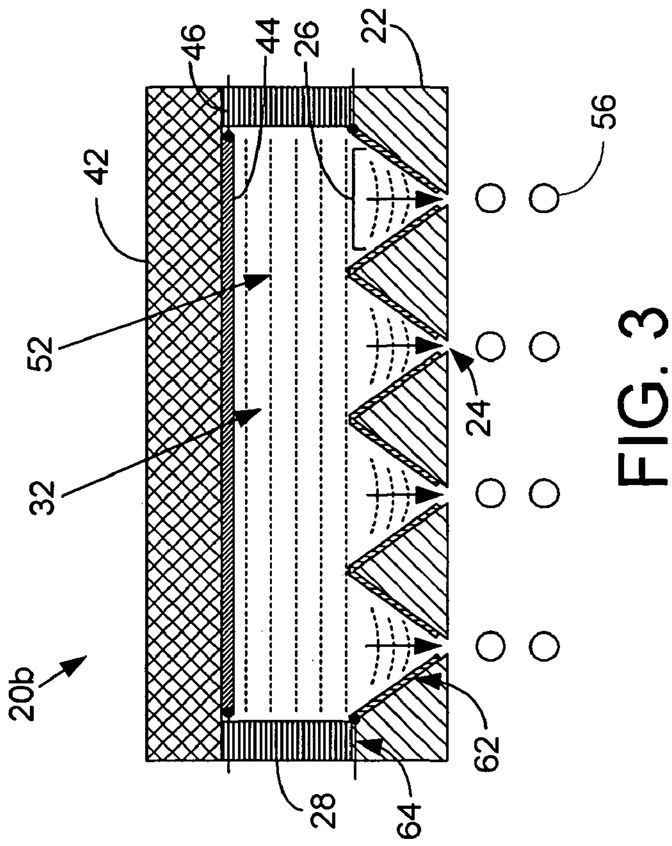
FIG. 3 is an illustration of a cross-section of another embodiment of an electrospray system, as shown in FIG. 1.

FIG. 3 is an illustration of a cross-section of another embodiment of an electrospray system **20*b*, as shown in FIG. 1. In this embodiment, a second ionization source 62 is disposed on portions of the inside surfaces of ejector structures 26. An electrical potential can be applied to the second ionization source 62 via one or more sources through a line 64. As in the embodiment shown in FIG. 2, the second ionization source 62 can be made of similar materials and dimensions. The second ionization source 62** can cover a small fraction (about 1% or just a tip) or an entire surface (100%) of the nozzle inner surface. This ionization source may not only produce ionization of molecules in the fluid when operated in DC mode, but also can support formation of electrocapillary waves at the fluid interface near the nozzle tip when operated in the AC mode in order to facilitate formation the droplets whose size is even smaller than the nozzle tip opening.

The following fabrication process is not intended to be an exhaustive list that includes all steps required for fabricating the electrospray system **20*b*. In addition, the fabrication process is flexible because the process steps may be performed in a different order than the order illustrated in FIGS. 4A through 4**J.

Figure 4I:
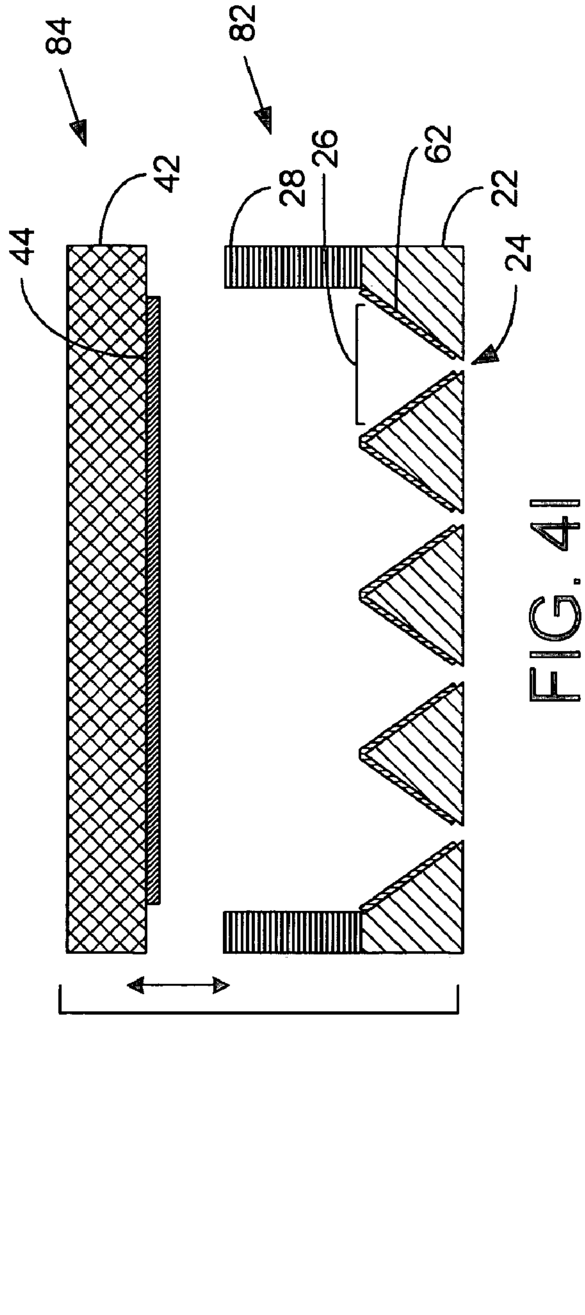

FIGS. 4A through 4J are illustrations of cross-sections of a representative embodiment of a method of forming the electrospray system shown in FIG. 3. FIG. 4A illustrates an array substrate 72 having a first masking layer 74 disposed thereon and patterned using photolithographic techniques. The first masking layer 74 can be formed of materials such as, but not limited to, a silicon nitride mask ($Si_3N_4$). The first mask layer 74 can be formed using techniques such as, but not limited to, plasma enhanced chemical vapor deposition, low pressure chemical vapor deposition, and combinations thereof. The patterning of the first masking layer 74 is done using standard photolithography techniques.

FIG. 4B illustrates the array substrate 72 after being etched to form the array structure 22 having ejector structures 26 formed in areas where the mask 74 was not disposed. The etching of the array substrate 72 to form the ejector structures 26. The etching technique can include, but is not limited to, a potassium hydroxide (KOH) anisotropic etch, reactive ion etching (RIE), and inductively coupled plasma etch (ICP), and focused ion beam (FIB) machining. It should also be noted that the array substrate 72 can be formed via stamping, molding, or other manufacturing technique.

An example of etching includes, but is not limited to, the formation of a pyramidal ejector structure having internal wall angles of about 54.74° using anisotropic KOH etch of a single crystal silicon wafer from the (100) surface. The KOH solution etches the exposed (100) planes more rapidly than the (111) planes to form the pyramidal ejector structure such as described in Madou, M. J. (2002). *Fundamentals of Microfabrication*. Boca Raton, Fla, CRC Press.

FIG. 4C illustrates the removal of the first masking layer 74 using a reactive ion etching (RIE) process or similar process, if necessary, while FIG. 4D illustrates the addition of a second masking 76. The second masking layer 76 can be formed of materials such as, but not limited to, a photoresist mask, a silicon nitride (hard) mask ($Si_3N_4$), and a silicon oxide (hard) mask ($SiO_2$) which is patterned using photolithography techniques. The second masking layer 76 can be formed using techniques such as, but not limited to photolithography etching, inductively coupled plasma (ICP) etching, and reactive ion etching (RIE), and combinations thereof FIG. 4E illustrates the etching of the second mask layer 76 to form the ejector nozzle 24 in the array substrate 22. The etching technique can include, but is not limited to, photolithography etching, inductively coupled plasma (ICP) etching, and reactive ion etching (RIE). Alternatively, depending on the size and geometry, the ejector nozzles **24*a* and 24*b* can be cut from the wafer, using a dicing saw or other similar device. Also, the ejector nozzles 24*a* and 24*b* can be machined using focused ion beam (FIB), and laser or electron beam (E-beam) drilling as opposed to using the second mask layer 76**.

FIG. 4F illustrates the removal of the second mask layer 76 using a reactive ion etching (RIE) process or similar process. FIG. 4G illustrates the deposition of the second ionization source 62 on the inside wall of the ejector structure 26. The deposition techniques can include, but are not limited to, evaporation, sputtering, chemical vapor deposition (CVD), and electroplating.

FIG. 4H illustrates the placement of the separating layer 28 on portions of the array structure 22 to form the lower portion 82 of the electrospray system **20*b*. The separating layer 28 can be made separately by etching silicon, machining of the metal, or stamping the polymer. Once fabricated, this separating layer 28 can be bonded to the array structure 22 using a polyimide layer (such as Kapton™ or other bonding material). This dry film can be laminated and patterned using laser micromachining or photolithography techniques. The separating layer 28 can then be affixed/bonded to the piezoelectric transducer to form the operational device. Alternatively, the separating layer 28 is bonded to the upper portion 84 using a polyimide layer, for example. Then the separating layer 28 is bonded to the array structure 22**.

Figure 4J:
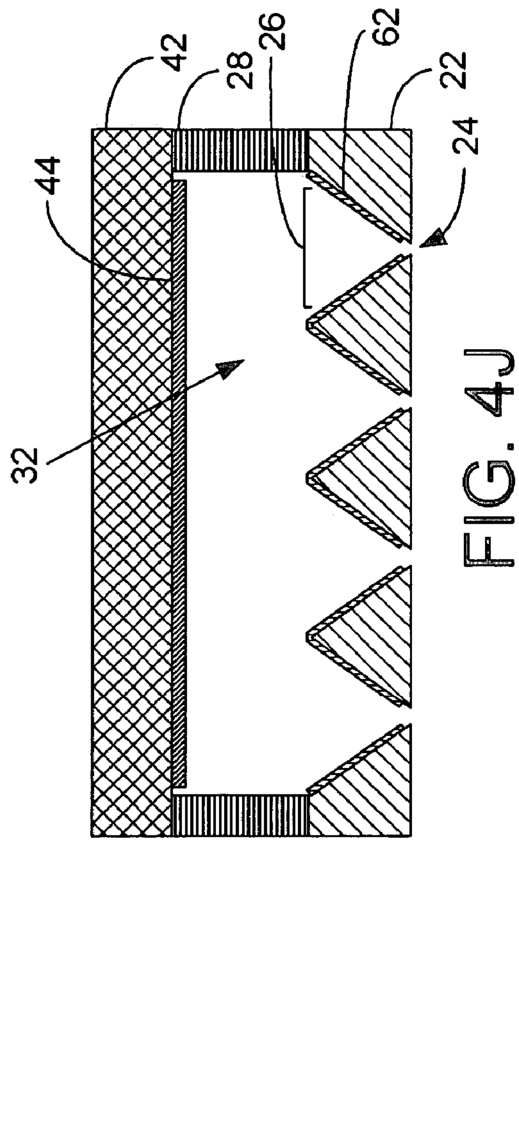

FIG. 4I illustrates the lower portion 82 of the electrospray system 20*b* and the upper portion 84 of the electrospray system 20*b*, while FIG. 4J illustrates the formation of the electrospray system 20*b* by joining (e.g., bonding and/or adhering) the lower portion 82 and the upper portion 84. It should be noted that the lower portion 82 could be produced separately and be used as a disposable cartridge that is replaced regularly on the electrospray system 20*b*, while the upper portion 84 is reused. In another embodiment not shown, the lower portion 82 does not include the separating layer 28 and the separating layer 28 is disposed on the upper portion 84, so that the upper portion 84 with the separating layer 28 disposed thereon is reused. In still another embodiment, the separating layer 28 can be removed separately from either the upper portion 84 and the lower portion 82.

Figure 5:
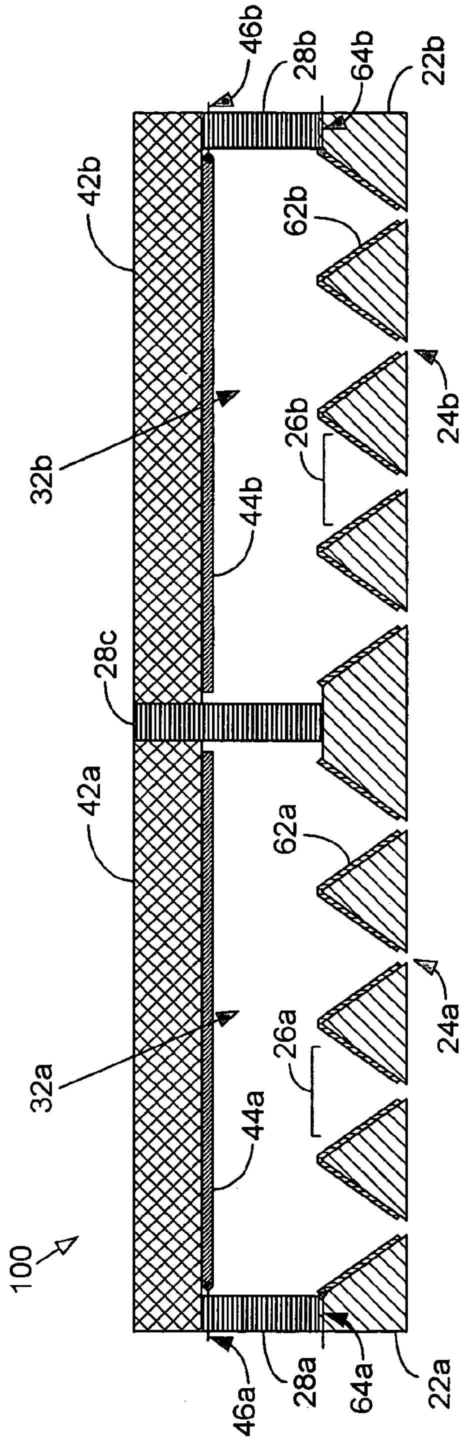
FIG. 5 is an illustration of a cross-section of another embodiment of an electrospray system, as shown in FIG. 1.

FIG. 5 is an illustration of a cross-section of another embodiment of an electrospray system 12, as shown in FIG. 1. In this embodiment, the electrospray system 100 includes a first reservoir 32*a* and a second reservoir 32*b*. In addition, the first reservoir 32*a* and the second reservoir 32*b* each are adjacent a first actuator 42*a* and a second actuator 42*b*, respectively. Furthermore, the first reservoir 32*a* and the second reservoir 32*b* each are adjacent a first ejector structure 24*a* and a second ejector structure 24*b*, respectively.

The first reservoir 32*a* and the second reservoir 32*b* are separated by a center separating layer 28*c*. The first reservoir 32*a* is bound by the first separating layer 28*a*, the center separating layer 28*c*, the first actuator 42*a*, and the first ejector structure 26*a*. The second reservoir 32*b* is bound by the second separating layer 28*b*, the center separating layer 28*c*, the second actuator 42*b*, and the second ejector structure 26*b*. The same or a different fluid can be disposed in the first reservoir 32*a* and the second reservoir 32*b*, chosen to match the acoustic properties of the sample loaded in the cavity of the ejector structures 26*a* and 26*b*, respectively. This configuration allows one to generate electrosprays of different fluids by simply electronically choosing the first actuator 42*a*, or the second actuator 42*b*. The number of the reservoirs can be increased by replicating this structure in the lateral dimension.

Figure 6:
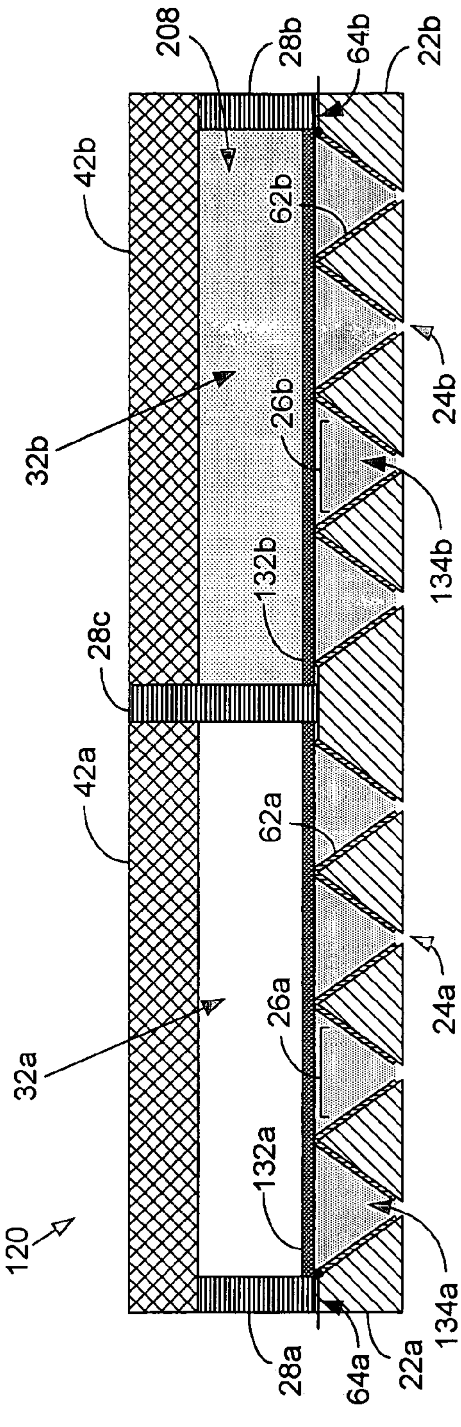
FIG. 6 is an illustration of a cross-section of another embodiment of an electrospray system, as shown in FIG. 1.

FIG. 6 is an illustration of a cross-section of another embodiment of an electrospray system 12, as shown in FIG. 1. Similar to the electrospray system 100 shown in FIG. 5, the electrospray system 120 shown in FIG. 6 includes a first reservoir 32*a* and a second reservoir 32*b*. The first reservoir 32*a* is bound by the first separating layer 28*a*, the center separating layer 28*c*, the first actuator 42*a*, and the first ejector structure 22*a*. The first reservoir 32*a* includes a gas bubble (not shown). The second reservoir 32*b* is bound by the second separating layer 28*b*, the center separating layer 32*c*, a second actuator 42*b*, and the second ejector structure 22*b*. The second reservoir 32*b* includes a fluid bubble 208.

Figure 7:
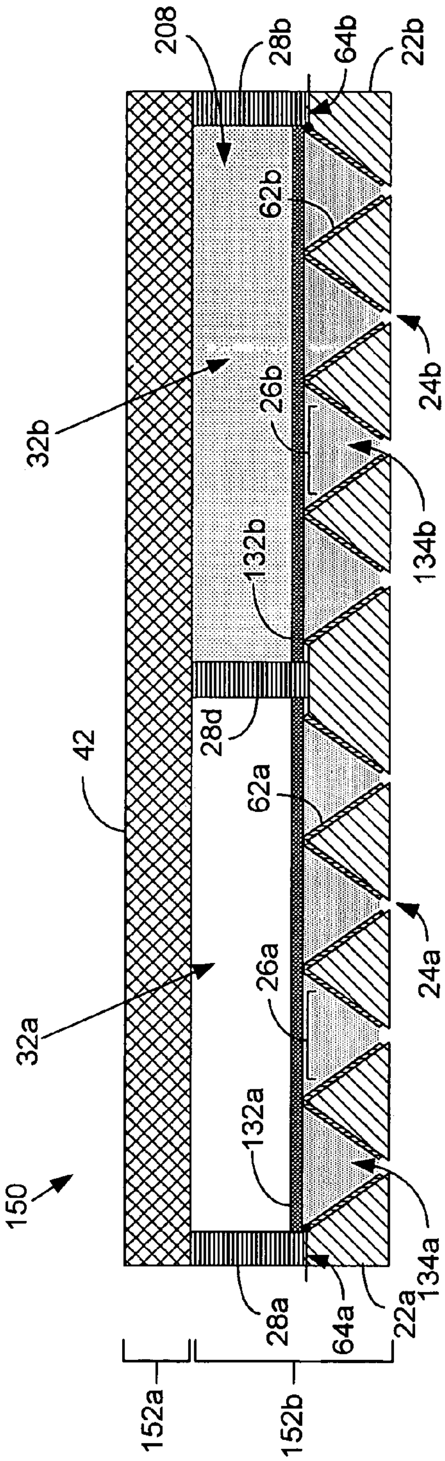
FIG. 7 is an illustration of a cross-section of another embodiment of an electrospray system, as shown in FIG. 1.

In addition, as shown in FIG. 7, the electrospray system 120 includes a first separating structure 132*a* and a second separating structure 132*b*, each disposed on top of the first ejection structure 26*a* and the second ejection structure 26*b*, respectively, separating the first reservoir 32*a* and the second reservoir 32*b* from the first array structure 22*a* and second array structure 22*b*, respectively. As demonstrated later with respect to FIGS. 8A through 8K, the first array structure 22*a* and second array structure 22*b* are filled with a first fluid 134*a* and a second fluid 134*b*, respectively, and then the first separating structure 132*a* and the second separating structure 132*b* are disposed on top of the first ejection structure 26*a* and the second ejection structure 26*b*. It should be noted that the electrospary system 120 does not include a first ionization source 44*a* and 44*b* since the first actuator 42*a* and the second actuator 42*b* are separated from the first fluid 134*a* and the second fluid 134*b*. This allows for individually addressable ionization sources, whose potential can be individually controlled.

The first separating structure 132*a* and the second separating structure 132*b* can be one structure or two distinct structures, which show little impedance to propagation of acoustic waves at the operation frequency of the actuators 42*a* and 42*b*. The first separating structure 132*a* and the second separating structure 132*b* can be made of materials such as, but not limited to polyimide layer (such as Kapton™), pyrolene, and other suitable materials. The first separating structure 132*a* and the second separating structure 132*b* can have a thickness of about 1 micrometers to 200 micrometers. The length and width of the first separating structure 132*a* and the second separating structure 132*b* will depend upon the dimensions of the first array structure 22*a* and second array structure 22*b*.

The first fluid 134*a* can be ejected out of the first ejection structure 26*a* by controllably positioning the fluid bubble (not shown) substantially between the first separating structure 132*a* and the first actuator 42*a* to fill in the reservoir 32*a*. Likewise, the second fluid 134*b* can be ejected out of the second ejection structure 26*b* by controllably positioning the fluid bubble 208 substantially between the second separating structure 132*b* and the second actuator 42*b* to fill in the reservoir 32*b*.

The ejection of the first fluid 134*a* and second fluid 134*b* can be controlled in at least two ways for the electrospray system 120 shown in FIG. 6. First, the first actuator 42*a* and the second actuator 42*b* can be individually activated to cause ejection of the first fluid 134*a* and the second fluid 134*b* if the fluid bubble 208 is properly positioned. Second, a gas bubble (not shown) can be positioned substantially between the first separating structure 132*a* and the first actuator 42*a* and/or the second separating structure 132*b* and the second actuator 42*b*. Since the gas bubble does not effectively couple to and transmit the ultrasonic pressure wave, the first fluid 134*a* and the second fluid 134*b* will not be ejected, even if the first actuator 42*a* and/or the second actuator 42*b* are activated. The process for selectively ejecting fluid from one or more ejector structures is described in further detail in FIGS. 9A though 9D and 10A through 10F.

FIG. 7 is an illustration of a cross-section of another embodiment of an electrospray system 12, as shown in FIG. 1. In contrast to the electrospray system 120 in FIG. 6, the electrospray system 150 shown in FIG. 7 includes only a single actuator 42 in communication with the first reservoir 32*a* and the second reservoir 32*b*. As in the electrospray system 120 in FIG. 6, the first fluid 134*a* can be ejected out of the first ejection structure 26*a* by controllably positioning the fluid bubble (not shown) substantially between the first separating structure 132*a* and the first actuator 42*a* to fill in the reservoir 32*a*. Likewise, the second fluid 134*b* can be ejected out of the second ejection structure 26*b* by controllably positioning the fluid bubble 208 substantially between the second separating structure 132*b* and the second actuator 42*b* to fill in the reservoir 32*b*.

In addition, the first fluid 134*a* can not be ejected out of the first ejection structure 26*a* when the gas bubble (not shown) is positioned substantially between the first separating structure 132*a* and the first actuator 42*a* to fill in the reservoir 32*a*. Likewise, the second fluid 134*b* can not be ejected out of the second ejection structure 26*b* when the gas bubble (not shown) is positioned substantially between the second separating structure 132*b* and the second actuator 42*b* to fill in the reservoir 32*b*.

Therefore, upon actuation of the actuator 42 and positioning of the fluid bubble 208 and the gas bubble, the ejection of the first fluid 134*a* and the second fluid 134*b* can be selectively controlled. For example, in the configuration in FIG. 7, actuation of the actuator 42 causes the second fluid 134*b* to be ejected, while the first fluid 134*a* is not ejected. The process for selectively ejecting fluid from one or more ejector structures is described in further detail in FIGS. 9A though 9C and 10A through 10E.

The following fabrication process is not intended to be an exhaustive list that includes all steps required for fabricating the electrospray system 150. In addition, the fabrication process is flexible because the process steps may be performed in a different order than the order illustrated in FIGS. 8A through 8K.

Figure 8A:
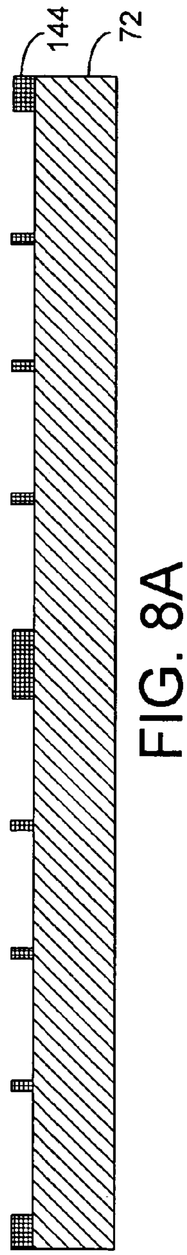
FIGS. 8A through 8K are illustrations of cross-sections of a representative embodiment of a method of forming the electrospray system shown in FIG. 7.

FIGS. 8A through 8K are illustrations of cross-sections of a representative embodiment of a method of forming the electrospray system shown in FIG. 7. FIG. 8A illustrates an array substrate 72 having a first masking layer 144 disposed thereon. The first masking layer 144 can be formed of materials such as, but not limited to, a silicon nitride mask ($Si_3N_4$), silicon oxide ($SiO_2$) and patterned using standard photolithography techniques. The first mask 144 can be disposed using techniques such as, but not limited to, inductively coupled plasma (ICP) etch, reactive ion etch (RIE), or wet etching.

Figure 8B:
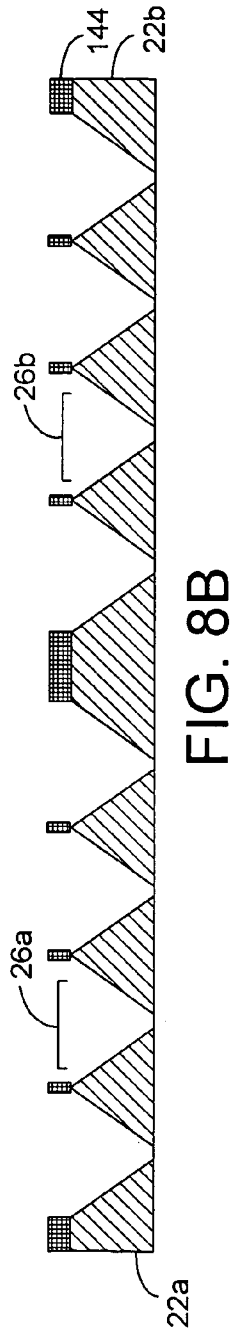

FIG. 8B illustrates the array substrate 72 after being etched to form the first array structure 22*a* and the second array structure 22*b* having the first ejector structures 26*a* and the second ejector structure 26*b* formed in areas where the mask 144 was not disposed. The etching of the array substrate 72 to form the first ejector structures 26*a* and the second ejector structure 26*b*. The etching technique can include, but is not limited to, a potassium hydroxide (KOH) anisotropic etch of (100) single crystal silicon and laser micro-machining.

Figures 8C, 8D, 8E, 8F, 8G:
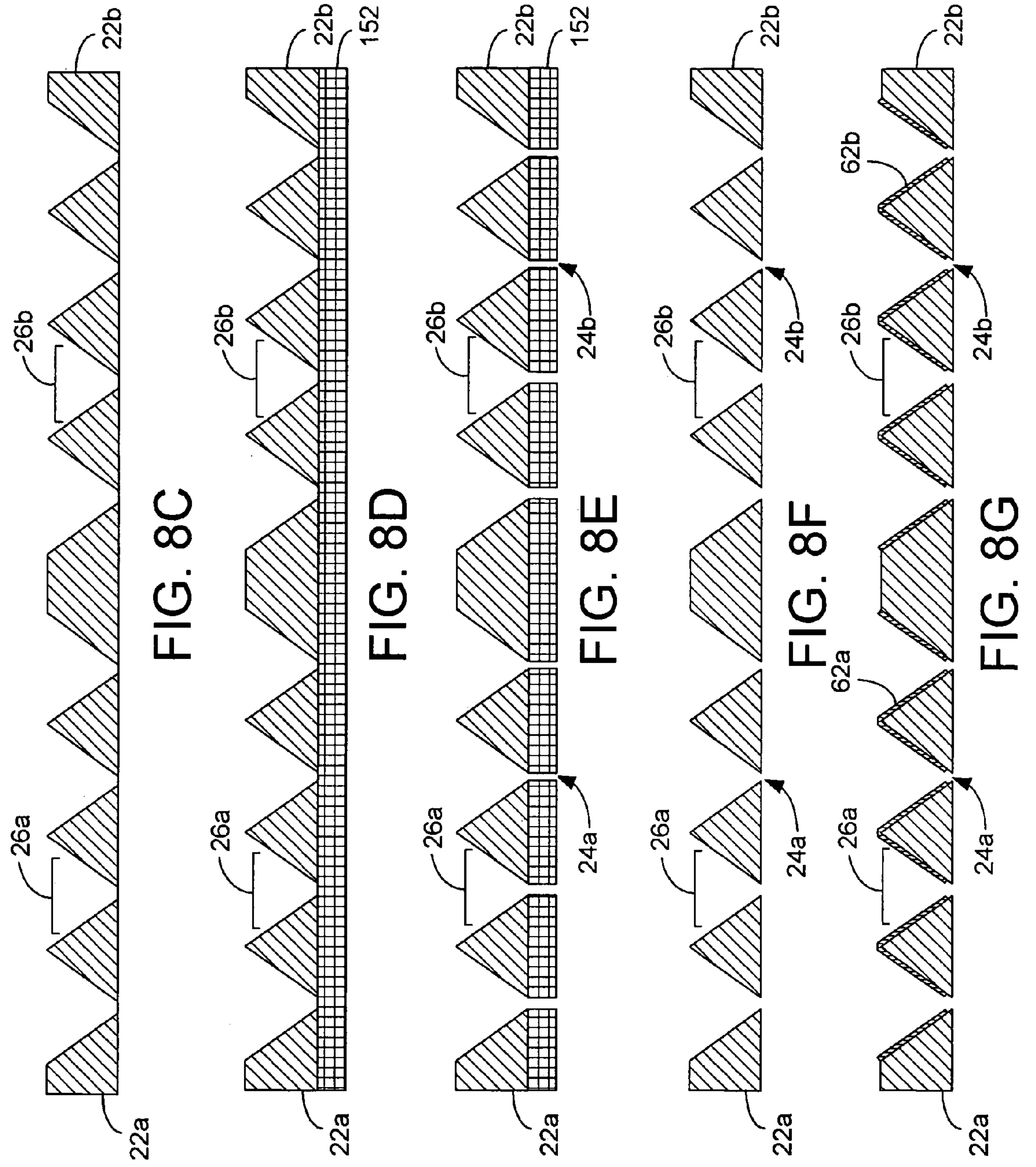

FIG. 8C illustrates the removal of the first mask 144 using a reactive ion etching (RIE) process or similar process, and FIG. 8D illustrates the addition of a second masking layer 152. The second mask 152 can be formed of materials such as, but not limited to, a silicon nitride mask ($Si_3N_4$), a silicon oxide mask ($SiO_2$), or a photoresist.

FIG. 8E illustrates the etching of the second mask 152 to form the ejector nozzles 24*a* and 24*b* for the first ejector structure 26*a* and the second ejector structure 26*b*, respectively. The etching technique can include, but is not limited to, photolithography etching, inductively coupled plasma (ICP) etching, reactive ion etching (RIE), and wet chemical etching. Alternatively, depending on the size and geometry, the ejector nozzles 24*a* and 24*b* may be cut from the wafer, using a dicing saw or other similar device, and can be machined using focused ion beam (FIB), and laser or electron beam (E-beam) drilling, as opposed to using the second mask 152. FIG. 8F illustrates the removal of the second mask 152 using a reactive ion etching (RIE) process or similar process.

FIG. 8G illustrates the deposition of the second ionization source 62*a* and 62*b* on the inside wall of the first ejector structure 26*a* and the second ejector structure 26*b*, respectively. The deposition techniques can include, but are not limited to, evaporation, sputtering, chemical vapor deposition, and electroplating.

Figures 8H, 8I, 8J:
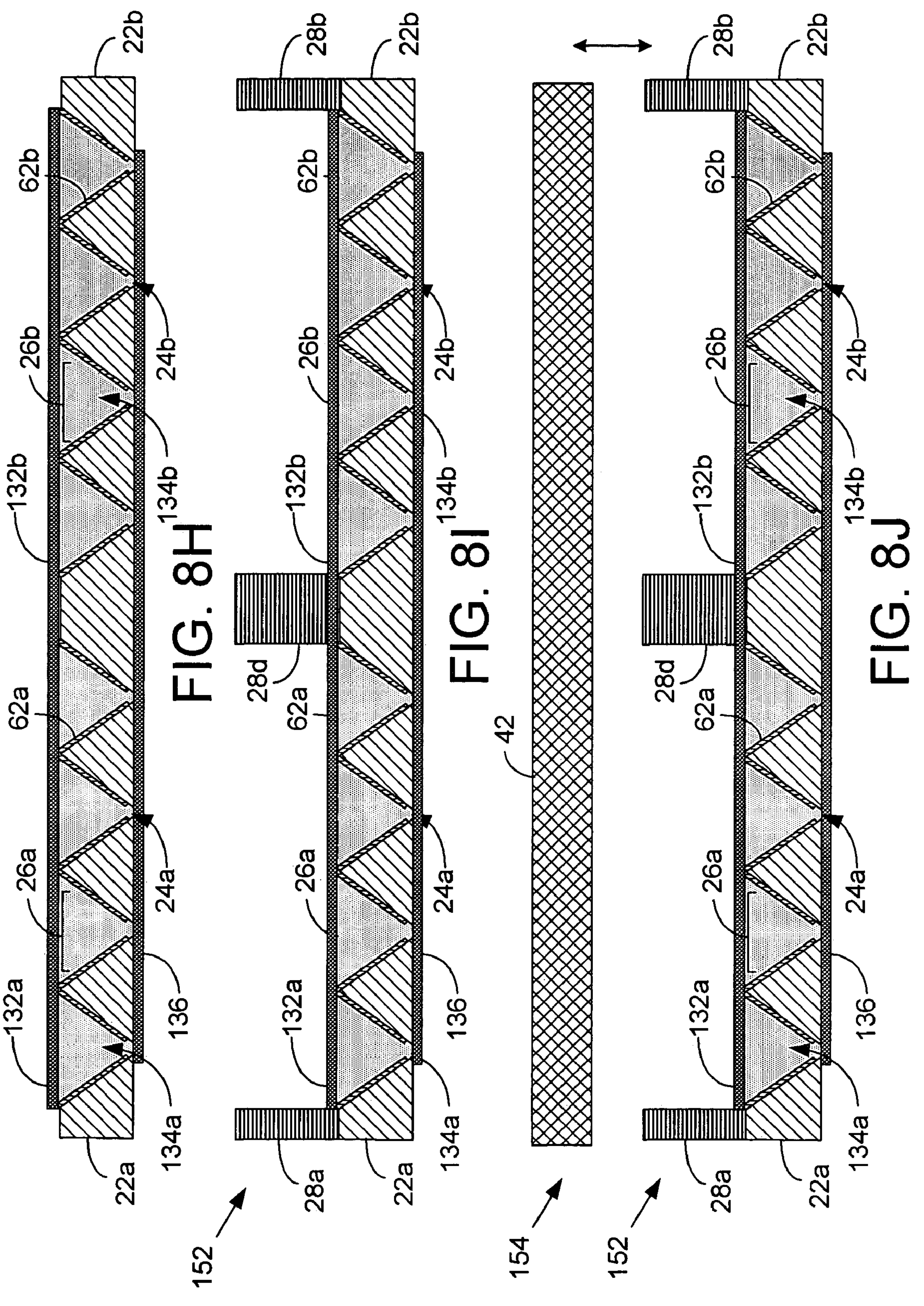

FIG. 8H illustrates the formation of the first separating structure 132*a* and the second separating structure 132*b* (these structures can be the same or be two distinct structures). In addition, an ejector nozzle sealing structure 136 is disposed on top of the ejector nozzles 24*a* and 24*b* of the first ejector structure 26*a* and second ejector structure 26*b*. The ejector nozzle sealing structure 136 can be made of materials such as, but not limited to, polyimide layer (such as Kapton) or some other inert layer such as parylene film.

Prior to the formation of the first separating structure 132*a* and the second separating structure 132*b*, the first ejector structure 26*a* and second ejector structure 26*b* are filled with a first fluid 134*a* and a second fluid 134*b*. The first fluid 134*a* and the second fluid 134*b* can be the same fluid or different fluids.

FIG. 8I illustrates the placement of the first separating layer 28*a*, the second separating layer 28*b*, and a center separating layer 28*d* on portions of the first array structure 22*a* and the second array structure 22*b* to form the lower portion 152 of the electrospray system 150. The first separating layer 28*a*, the second separating layer 28*b*, and a center separating layer 28*d* can each be made separately by etching silicon or simple machining of the metal or stamping the polymer. Once fabricated, the first separating layer 28*a*, the second separating layer 28*b*, and a center separating layer 28*d* each can be bonded to the nozzle array using a polyimide layer (such as Kapton). This dry film can be laminated and patterned using laser micro-machining or photolithography techniques. This spacer layer can then be affixed/bonded to the piezoelectric transducer to form the operational device.

It should be noted that the first separating layer 28*a*, the second separating layer 28*b*, and a center separating layer 28*d* can be disposed on portions of the first array structure 22*a* and the second array structure 22*b* prior to the formation of the first separating structure 132*a* and the second separating structure 132*b* and/or the ejector nozzle sealing structure 136. In addition, the first fluid 134*a* and the second fluid 134*b* can be disposed in the first ejector structure 26*a* and second ejector structure 26*b* after the first separating layer 28*a*, the second separating layer 28*b*, and the center separating layer 28*d* are formed.

In this regard, a structure including the first ejector structure 26*a* and the second ejector structure 26*b* and the first separating layer 28*a*, the second separating layer 28*b*, and the center separating layer 28*d* can be produced. Then in a separate process, the ejector nozzle sealing structure 136 can be positioned adjacent the first ejector nozzle 24*a* and the second ejector nozzle 24*b*, respectively. Subsequently, the first fluid 134*a* and the second fluid 134*b* can be dispensed into the first ejector structure 26*a* and second ejector structure 26*b*, respectively. Lastly, the first separating structure 132*a* and the second separating structure 132*b* can be disposed on the top of the first ejector nozzle 24*a* and the second ejector nozzle 24*b*, respectively.

In another embodiment not shown, the lower portion 152 does not include the first separating layer 28*a*, the second separating layer 28*b*, and the center separating layer 28*d*. The first separating layer 28*a*, the second separating layer 28*b*, and the center separating layer 28*d* are disposed on the upper portion 154. Therefore, the upper portion 154 with the first separating layer 28*a*, the second separating layer 28*b*, and the center separating layer 28*d* disposed thereon can be reused. In still another embodiment, the first separating layer 28*a*, the second separating layer 28*b*, and the center separating layer 28*d* can be removed separately from either the upper portion 154 or the lower portion 152.

Figure 8K:
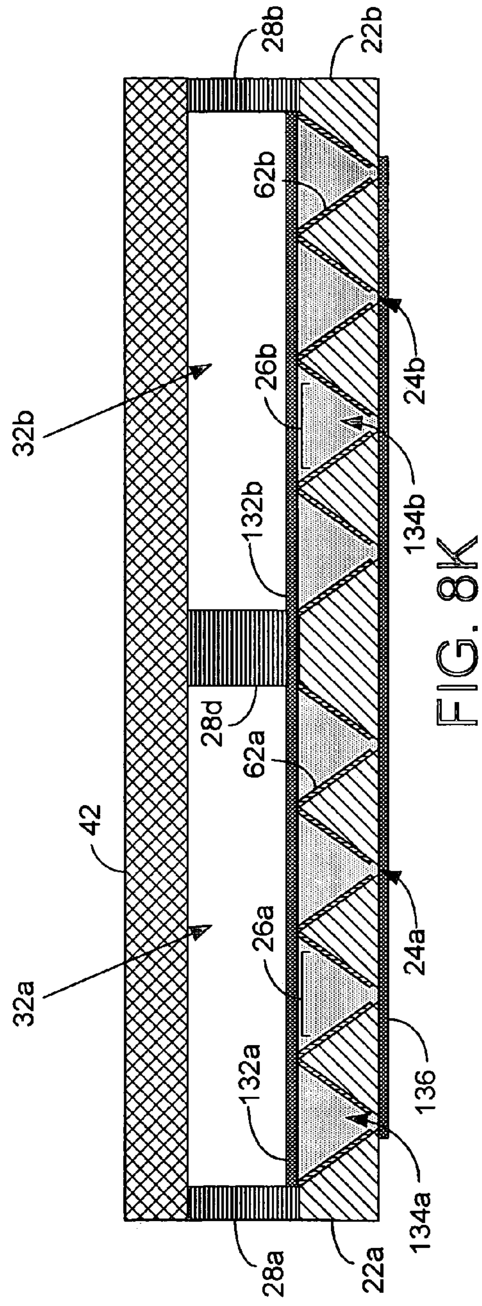

FIG. 8J illustrates the lower portion 152 of the electrospray system 150 and the upper portion 154 of the electrospray system 150, and FIG. 8K illustrates the formation of the electrospray system 150 by joining (e.g., bonding and/or adhering) the lower portion 152 and the upper portion 154. It should be noted that the lower portion 152 could be produced separately and be used as a disposable cartridge that is replaced regularly on the electrospray system 150, while the upper portion 154 is reused.

Figure 9C:
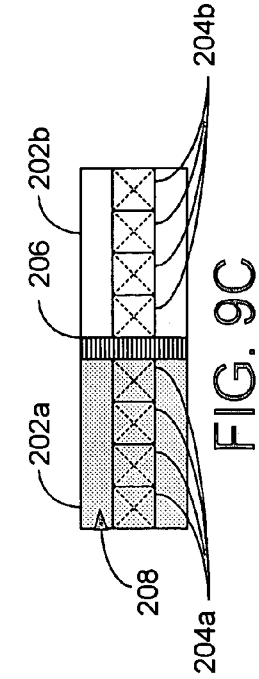
FIGS. 9A through 9D are illustrations of top views of representative embodiments of an electrospray system.
Figure 9D:
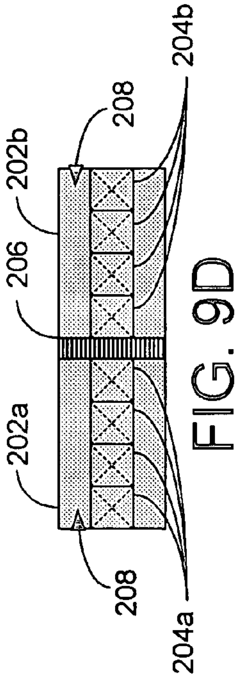
Figure 9A:
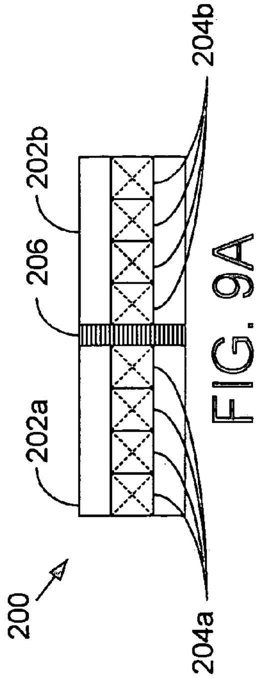
Figure 9B:
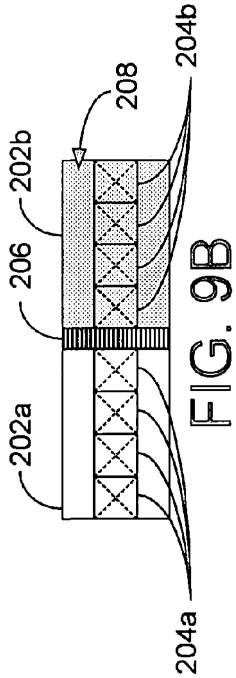

FIGS. 9A through 9D are illustrations of top views of representative embodiments of an electrospray system 200. FIG. 9B illustrates a fluid bubble in one section of the electrospray system 200, while FIG. 9C illustrates a fluid bubble in the other section of the electrospray system 200. The electrospray system 200 has a single actuator (not shown) positioned in communication with a first reservoir 202*a* and a second reservoir 202*b*. The first reservoir 202*a* and the second reservoir 202*b* are separated from each other by a separating layer 206. The first reservoir 202*a* and the second reservoir 202*b* are separated from the array structure (not shown) having a first ejector structure 204*a* and a second ejector structure 204*b* by a first separating structure and a second separating structure (not shown). The first ejector structure 204*a* and the second ejector structure 204*b* each contain a fluid within their respective cavities.

FIG. 9A illustrates the electrospray system 200 in a state where only gas bubbles (not shown) are positioned within the first reservoir 202*a* and the second reservoir 202*b*. As mentioned above, a gas bubble does not effectively couple to and transmit the ultrasonic pressure wave, so upon actuation of the actuator substantially no fluid is ejected from the first ejector structure 204*a* and the second ejector structure 204*b*.

FIG. 9B illustrates an acoustically responsive fluid bubble 208 in the second reservoir 202*b* of the electrospray system 200. Since the fluid bubble 208 can substantially couple to and transmit the ultrasonic pressure wave, actuation of the actuator causes the fluid within the second ejector structure 204*b* to be ejected through the ejectors nozzles of the second ejector structure 204*b*, but substantially no fluid is ejected from the first ejector structure 204*a* since the gas bubble does not effectively couple to and transmit the ultrasonic pressure wave produced by the actuator.

FIG. 9C illustrates an acoustically responsive fluid bubble 208 in the first reservoir 202*a* of the electrospray system 200. Since the fluid bubble 208 can substantially couple to and transmit the ultrasonic pressure wave, actuation of the actuator causes the fluid within the first ejector structure 204*a* to be ejected through the ejectors nozzles of the first ejector structure 204*a*, but substantially no fluid is ejected from the second ejector structure 204*b* since the gas bubble does not effectively couple to and transmit the ultrasonic pressure wave produced by the actuator.

FIG. 9D illustrates acoustically responsive fluid bubbles 208 in the first reservoir 202*a* and the second reservoir 202*b* of the electrospray system 200. Since the fluid bubble 208 can substantially couple to and transmit the ultrasonic pressure wave, actuation of the actuator causes the fluid within the first ejector structure 204*a* and the second ejector structure 204*b* to be ejected through the ejectors nozzles of the first ejector structure 204*a* and the second ejector structure 204*b*.

FIGS. 10A through 10F are illustrations of top views of representative embodiments of an electrospray system 220 that may be used in a multiplexing format and/or parallel analysis. FIGS. 10B through 10E illustrate an acoustically responsive fluid bubble 208 being positioned from one section of the electrospray system 220 to another. The electrospray system 220 has a single actuator (not shown) positioned in communication with a first reservoir 222*a*, a second reservoir 222*b*, a third reservoir 222*c*, and a fourth reservoir 222*d*. The first reservoir 222*a*, the second reservoir 222*b*, the third reservoir 222*c*, and the fourth reservoir 222*d* are separated from each other by a first separating layer 226*a* and a second separating layer 226*b*. The first reservoir 222*a*, the second reservoir 222*b*, the third reservoir 222*c*, and the fourth reservoir 222*d* are separated from the array structure (not shown) having a first ejector structure 224*a*, a second ejector structure 224*b*, a third ejector structure 224*c*, and a fourth ejector structure 224*d*, by a first separating structure, a second separating structure, a third separating structure, and a fourth separating structure (not shown). The first reservoir 222*a*, the second reservoir 222*b*, the third reservoir 222*c*, and the fourth reservoir 222*d*, each contain a fluid within their respective cavities.

Figure 10D:
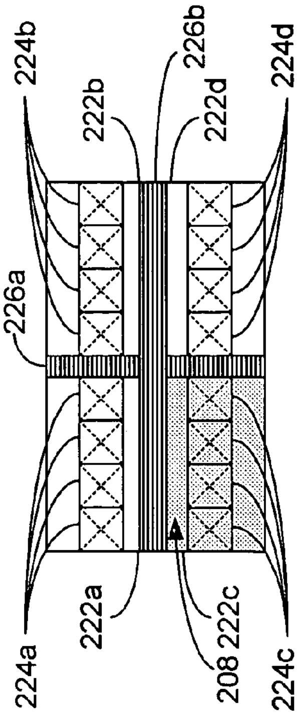
FIGS. 10A through 10F are illustrations of top views of representative embodiments of an electrospray system.
Figure 10E:
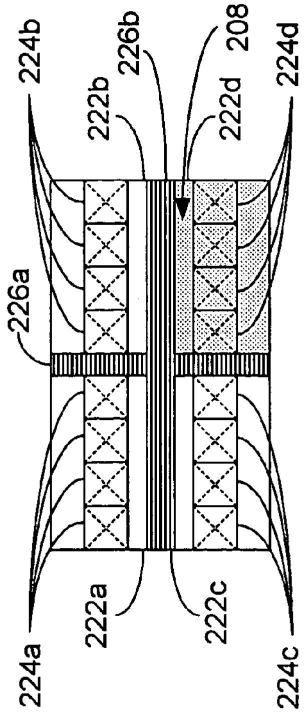
Figure 10F:
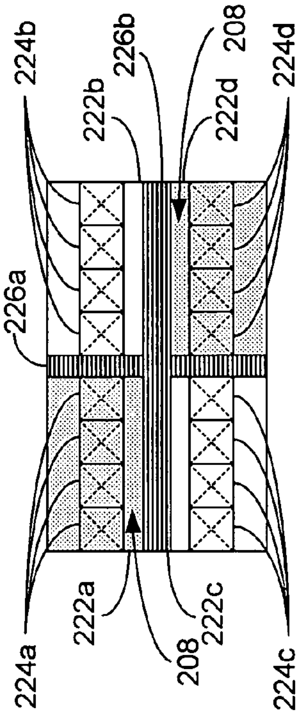
Figure 10A:
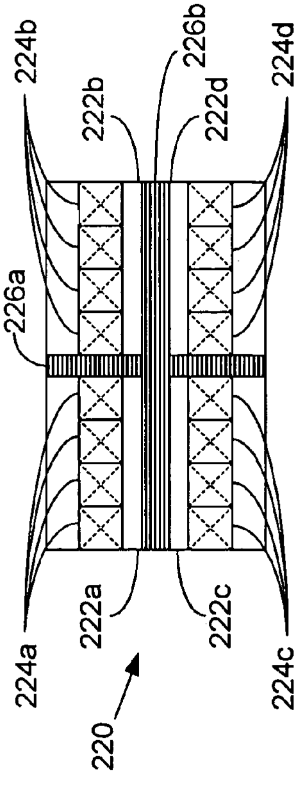
Figure 10B:
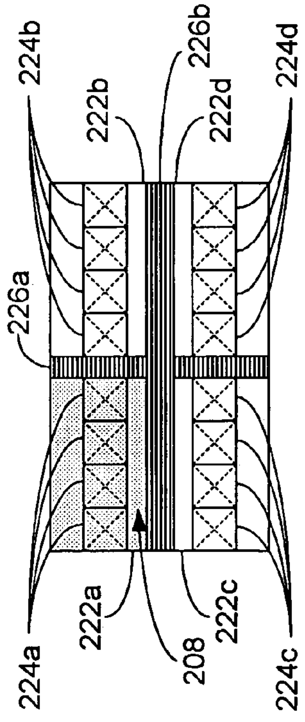
Figure 10C:
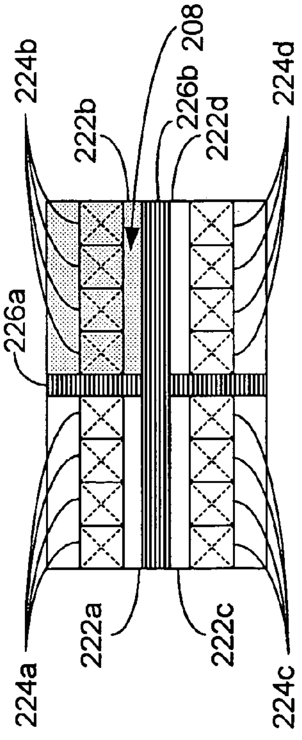

FIG. 10A illustrates the electrospray system 220 in a state where only gas bubbles (not shown) are positioned within the first reservoir 222*a*, the second reservoir 222*b*, the third reservoir 222*c*, and the fourth reservoir 222*d*. As mentioned above, a gas bubble does not effectively couple to and transmit the ultrasonic pressure wave. Thus, upon actuation of the actuators substantially no fluid is ejected from the first ejector structure 224*a*, the second ejector structure 224*b*, the third ejector structure 224*c*, and the fourth ejector structure 224*d*.

Similar to FIGS. 9A through 9D, an acoustically responsive fluid bubble 208 is controllably moved from the first reservoir 222*a* to the fourth reservoir 224*c* in a stepwise manner in FIGS. 10B through 10E. Since the fluid bubble 208 can substantially couple to and transmit the ultrasonic pressure wave, actuation of the actuator causes the fluid within the ejector structure having the fluid bubble disposed in the corresponding reservoir to be ejected through the ejectors nozzles of the that ejector structure. However, substantially no fluid is ejected from the other ejector structures since the gas bubble does not effectively couple to and transmit the ultrasonic pressure wave produced by the actuator.

FIG. 10F illustrates an acoustically responsive fluid bubble 208 in the first reservoir 222*a* and the fourth reservoir 224*c*. Since the fluid bubble 208 can substantially couple to and transmit the ultrasonic pressure wave, actuation of the actuator causes the fluid within first ejector structure 224*a* and the fourth ejector structure 224*d* to be ejected through the ejectors nozzles of the each ejector structure. In other embodiments, the fluid bubble 208 can be positioned in one or more of the reservoirs so that one or more fluids within the ejector structures can be ejected simultaneously.

While embodiments of electrospray system are described in connection with Examples 1 and 2 and the corresponding text and figures, there is no intent to limit embodiments of the electrospray system to these descriptions. On the contrary, the intent is to cover all alternatives, modifications, and equivalents included within the spirit and scope of embodiments of the present disclosure.

EXAMPLE 1

Figure 11:
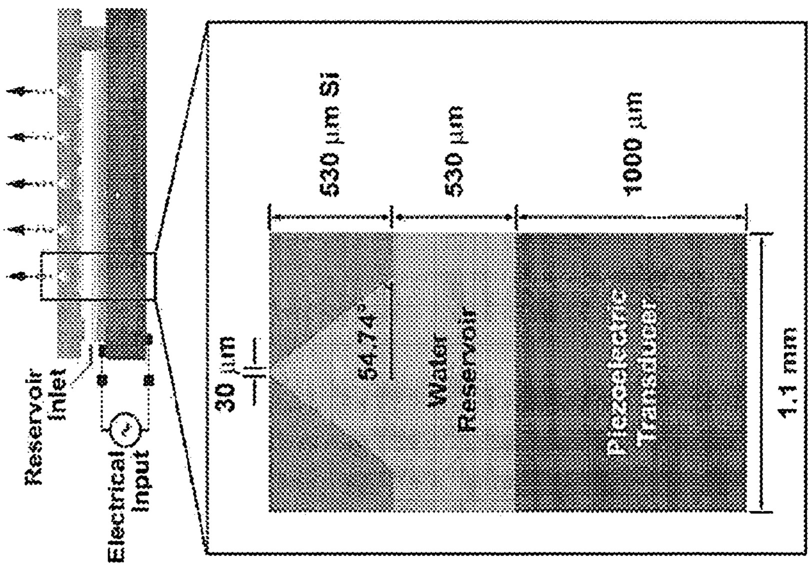
FIG. 11 is a schematic of a representative micro-machined ultrasonic droplet generator.

On-Demand Droplet Formation and Ejection Using Micromachined Ultrasonic Atomizer:

While embodiments of electrospray system are described in connection with examples 1 and 2 and the corresponding text and figures, there is no intent to limit embodiments of the electrospray system to these descriptions. On the contrary, the intent is to cover all alternatives, modifications, and equivalents included within the spirit and scope of embodiments of the present disclosure. An exemplary embodiment of a representative electrospray system has been developed and tested on a mass spectrometer (MS). As shown in FIG. 11, it includes of a piezoelectric transducer, a fluid reservoir, and a silicon cover plate containing the micromachined ejector nozzles, similar to the design in FIG. 1. A PZT-8 ceramic is selected for the piezoelectric transducer. The device generates droplets by utilizing cavity resonances in the about 1 to 5 MHz range, along with the acoustic wave focusing properties of liquid horns formed by a silicon wet etching process. At resonance, a standing acoustic wave is formed in the fluid reservoir with the peak pressure gradient occurring at the tip of the nozzle leading to droplet ejection. Finite element analysis using ANSYS (2003) not only confirms the acoustic wave focusing by the horn structure shown in FIG. 11, but also accurately predicts the resonant frequencies at which the device provides stable droplet ejection.

Figure 12:
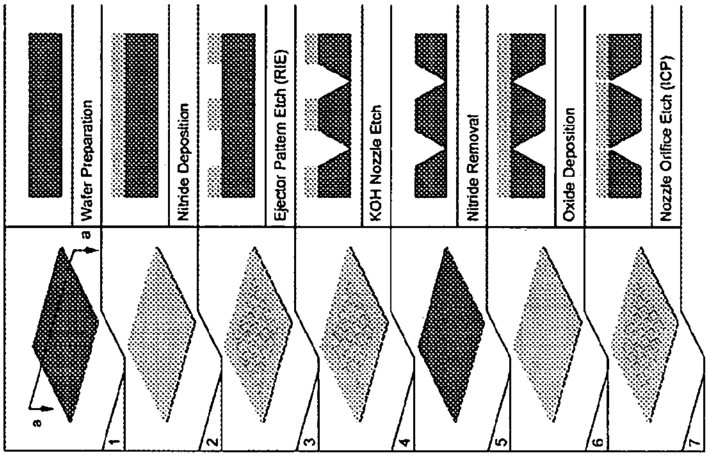
FIG. 12 is a schematic of a representative process for forming the micro-machined ultrasonic droplet generator illustrated in FIG. 11.

Although a number of horn shapes are capable of focusing acoustic waves, a pyramidal shape was selected as it can be readily fabricated via, for example, a single step potassium hydroxide (KOH) wet etch of (100) oriented silicon. As shown in FIG. 12, when square patterns are opened in a mask layer material, such as silicon nitride (FIG. 12, steps 2 and 3), deposited on the surface of a (100) oriented silicon wafer, and the edges are aligned to the <110> directions, the KOH solution etches the exposed (100) planes more rapidly than the (111) planes yielding a pyramid shaped horn (FIG. 12, step 4) making a 54.74° angle with the plane of the wafer. The sizes of the square features representing the base of the pyramid are designed so that the tip of these focusing pyramidal horns terminate within about 1 to 20 μm of the opposite surface of the ejector plate.

Figure 13A:
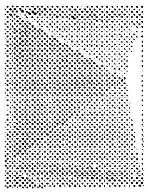
FIGS. 13A and 13B illustrate scanning electron micrographs (SEMs) of a KOH-etched pyramid-shaped horn with an ICP etched nozzle at the apex (FIG. 13A) and an array of nozzles fabricated on a silicon wafer (FIG. 13B).
Figure 13B:
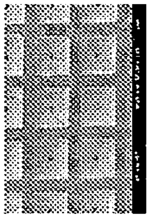

As the last step of the process, the nozzles of the desired diameter (about 3 to 5 μm in this embodiment) are formed by exemplary dry etching the remaining silicon from the opposite side in inductively coupled plasma (ICP) using a patterned silicon oxide layer as the hard mask (FIG. 12, steps 6 and 7). As shown in the Scanning Electron Micrographs (SEMs) in FIGS. 13A and 13B, this simple exemplary process, with only two masks and two etching steps, has been used to fabricate hundreds of pyramidal horns with nozzles on a single silicon wafer.

Figure 14A:
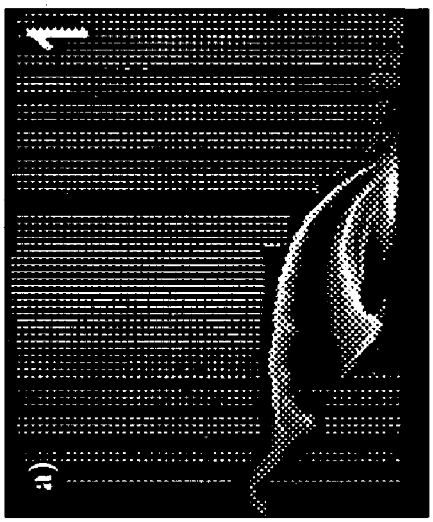
FIG. 14A illustrates a droplet ejection from several nozzles of a prototype device.
Figure 14B:
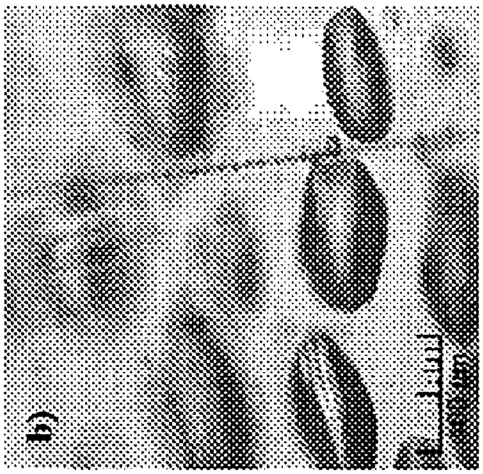
FIG. 14B illustrates a stroboscopic image of a jet of about 8 μm diameter droplets ejected by a representative electrospray system.
Figure 14C:
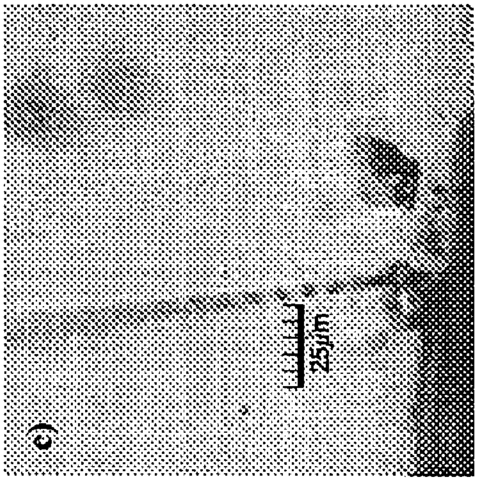
FIG. 14C illustrates a stroboscopic image of a jet of 5 μm droplets ejected by a representative electrospray system.

FIGS. 14A through 14C illustrate the device in operation, where the clouds of generated aerosol are emanating from the device. FIGS. 14B and 14C show enhanced stroboscopic images of about 8 μm and about 5 μm diameter water droplets ejected from a single nozzle on different wafers, at a frequency of about 1.4 MHz and about 916 kHz, respectively. By making the nozzles even smaller or exploiting the instabilities of the liquid interface during droplet formation (e.g., by promotion formation of electrocapillary waves at the fluid interface), it may be possible to produce even smaller, sub-micron droplets using this droplet generation technology.

EXAMPLE 2

Figure 15:
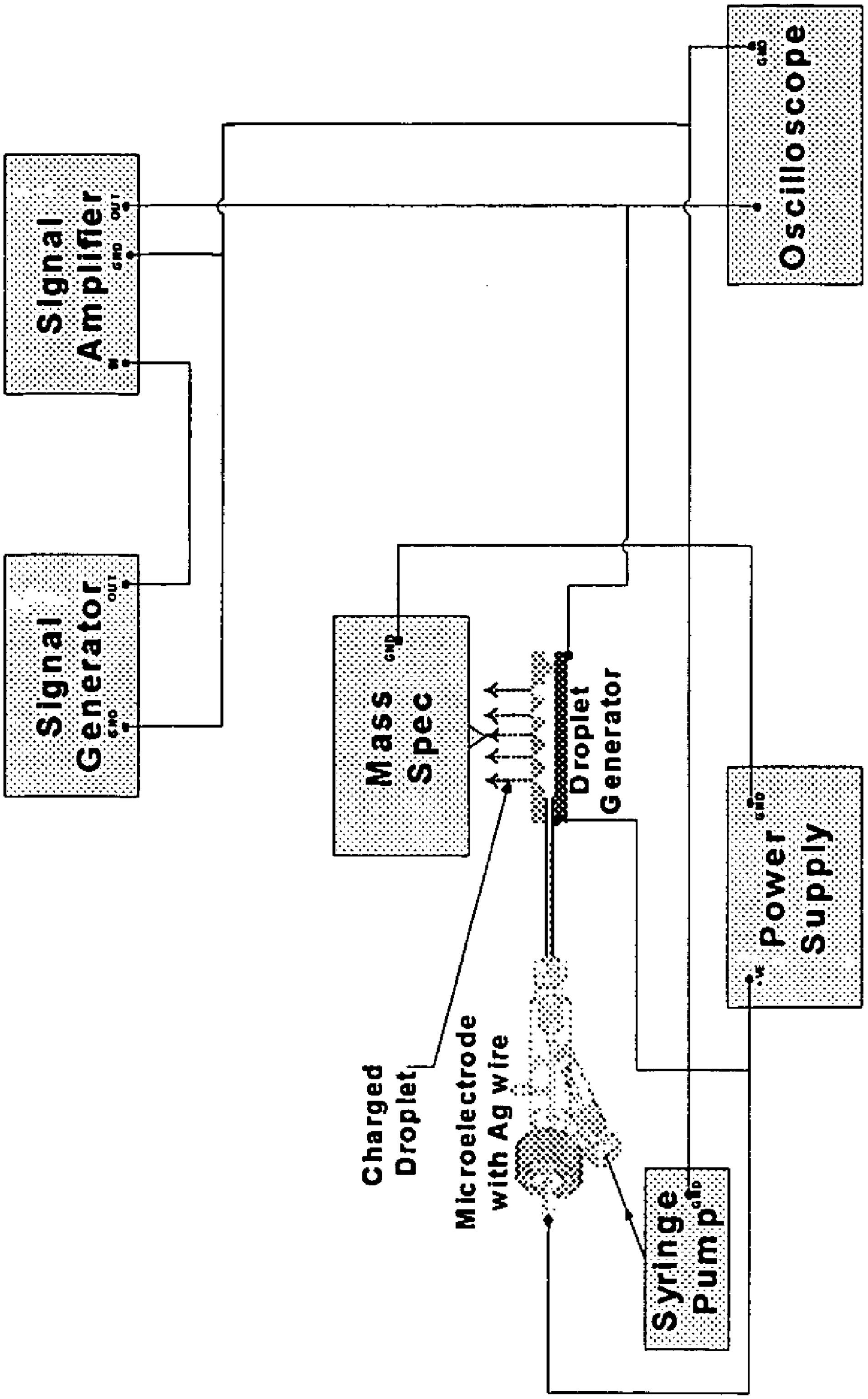
FIG. 15 illustrates a schematic of a representative experimental setup for experimental characterization of the micromachined ultrasonic electrospray array when interfaced with a mass spectrometer (MS).
Figure 16:
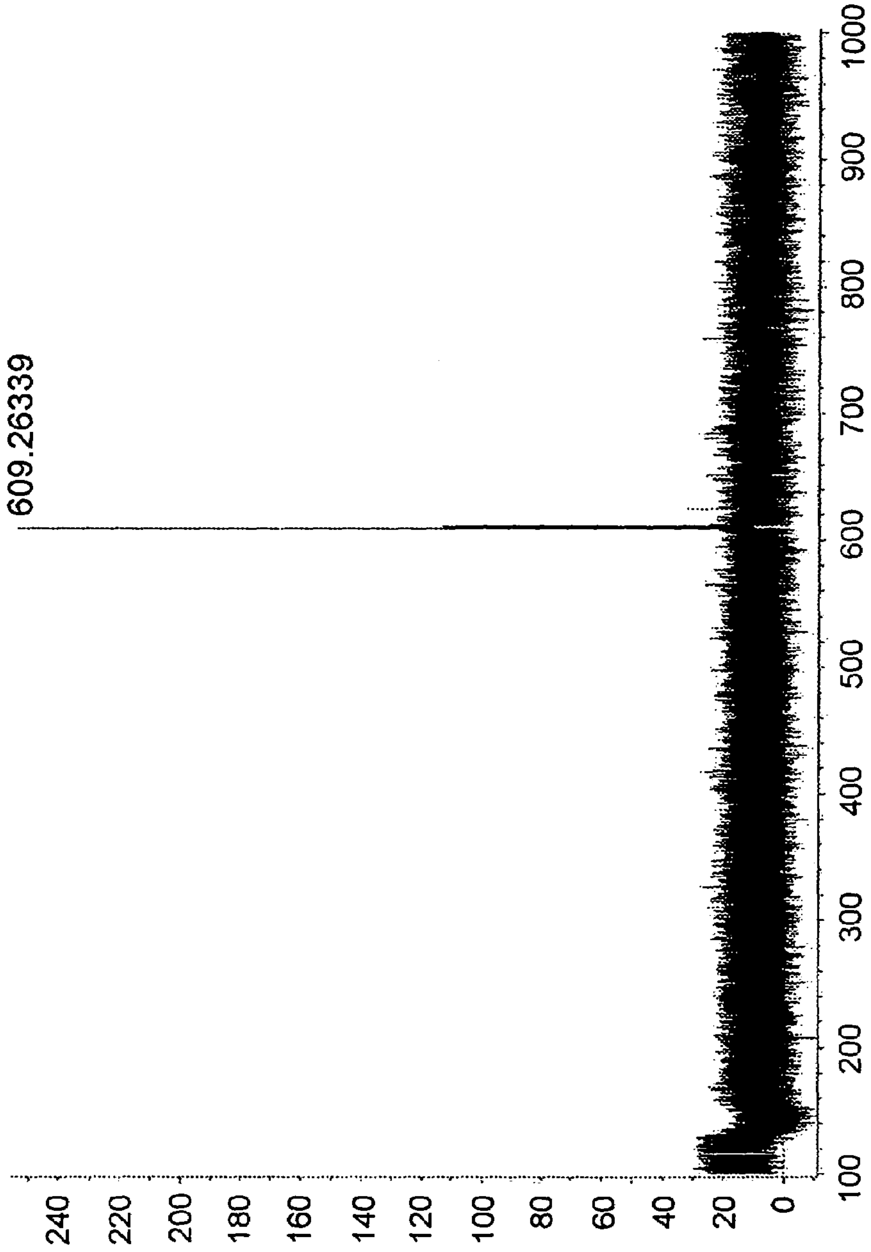
FIG. 16 illustrates an MS spectra of the MeOH:$H_2O$:Acetic Acid (50:49.9:0.1) solvent mixture containing a standard low molecular weight test compound reserpine (MW=609 Da, CAS# 50-55-5) ionized using the electrospray system.

Electrospray Generation of Protein Ions at Low Applied Voltages and MS Analysis:

Protein ions suitable for high sensitivity mass spectrometric analysis with an ionization voltage below 300 V (rather than kilovolts required by the conventional nanospray sources) have been produced using embodiments of the electrospray system. FIG. 15 illustrates a schematic of the experimental setup in which an electrode of the piezoelectric transducer is also used for electrochemical charging of the fluid by applying DC bias voltage in addition to the AC signal used for sound waves generation. FIG. 16 shows a strong peak of the 609 Da molecular weight compound (with signal-to-noise ratios of 3 or better) obtained in MS analysis of the mixture containing a standard low molecular weight test peptide, such as reserpine (MW=609 Da, CAS# 50-55-5), ionized using the embodiment of the electrospray system.

Although the best methodologies of this disclosure have been particularly described in the foregoing disclosure, it is to be understood that such descriptions have been provided for purposes of illustration only, and that other variations both in form and in detail can be made thereupon by those skilled in the art without departing from the spirit and scope of the present invention, which is defined solely by the appended claims.

What is claimed is:

1. An electrospray system comprising:

a first reservoir configured to store a first fluid including a first ionizable molecule;

a first actuator disposed in communication with the first reservoir configured to generate an ultrasonic pressure wave through the first fluid;

a direct current (DC) ionization source in direct contact with the first fluid, wherein the DC ionization source is configured to ionize the first ionizable molecule in the first fluid to form an ionized first molecule by producing a redox reaction in the first fluid; and a first set of ejector structures including at least one ejector nozzle configured to eject the first fluid in response to the ultrasonic pressure wave, wherein each ejector structure is configured to focus the ultrasonic pressure wave at a tip of the ejector nozzle, and wherein the first reservoir is disposed between the first actuator and the first set of ejector structures, wherein the first actuator and the DC ionization source are configured to form a plurality of ionized first molecules from the first fluid, wherein the ionized first molecules are ejected from the ejector nozzles of the first set of ejector structures upon activation of the first actuator and the DC ionization source.

2. The electrospray system of claim 1, wherein the ejector structure is selected from a horn structure and a pyramidal structure.

3. The electrospray system of claim 1, wherein the DC ionization source is disposed on the first actuator adjacent the first reservoir.

4. The electrospray system of claim 1, wherein the DC ionization source is disposed on an inside wall of the ejector structure adjacent the first reservoir.

5. The electrospray system of claim 1, wherein the DC ionization source is disposed on an inside wall of the ejector structure adjacent the first reservoir, and wherein the ionization source is disposed on the first actuator adjacent the first reservoir.

6. The electrospray system of claim 1, wherein the first actuator is selected from a piezoelectric actuator and a capacitive actuator.

7. The electrospray system of claim 6, wherein the first actuator operates in a range from about 100kHz to 100MHz.

8. The electrospray system of claim 1, wherein the DC ionization source operates at a DC voltage of about 0 to ±1000 volts.

9. The electrospray system of claim 1, wherein the diameter of the ejector nozzle controls a droplet size of ejected droplets.

10. The electrospray system of claim 1, wherein the first set of ejector structures are a resonant cavity configured to form a standing wave pattern and focus a standing acoustic pressure wave at the tip of the ejector nozzle.

11. A mass spectrometry system, comprising an electrospray system including:

a first reservoir configured to store a first fluid including a first ionizable molecule;

a first actuator disposed in communication with the first reservoir configured to generate an ultrasonic pressure wave through the first fluid;

an ionization source configured to ionize the first ionizable molecule to form a ionized first molecule; and a first set of ejector structures including at least one ejector nozzle configured to eject the first fluid in response to the ultrasonic pressure wave, wherein each ejector structure is configured to focus the ultrasonic pressure wave at a tip of the ejector nozzle, and wherein the first reservoir is disposed between the first actuator and the first set of ejector structures, wherein the first actuator and the ionization source are configured to form a plurality of ionized first molecules from the first fluid, wherein the ionized first molecules are ejected from the ejector nozzles of the first set of ejector structures upon activation of the first actuator and the ionization source.

12. The mass spectrometry system of claim 11, wherein the ejector structure is selected from a horn structure and a pyramidal structure.

13. The mass spectrometry system of claim 11, wherein the DC ionization source is disposed on the first actuator adjacent the first reservoir.

14. The mass spectrometry system of claim 11, wherein the DC ionization source is disposed on an inside wall of the ejector structure adjacent the first reservoir.

15. The mass spectrometry system of claim 11, wherein the DC ionization source is disposed on an inside wall of the ejector structure adjacent the first reservoir, and wherein the ionization source is disposed on the first actuator adjacent the first reservoir.

16. The mass spectrometry system of claim 11, wherein the first actuator is selected from a piezoelectric actuator and a capacitive actuator.

17. The mass spectrometry system of claim 16, wherein the first actuator operates in a range from about 100kHz to 100MHz.

18. A method, comprising:

providing an electrospray system comprising, a first reservoir configured to store a first fluid including a first ionizable molecule;

a first actuator disposed in communication with the first reservoir configured to generate an ultrasonic pressure wave through the first fluid;

a direct current (DC) ionization source in direct contact with the first fluid, wherein the DC ionization source is configured to ionize the first ionizable molecule in the first fluid to form an ionized first molecule by producing a redox reaction in the first fluid; and a first set of ejector structures including at least one ejector nozzle configured to eject the first fluid in response to the ultrasonic pressure wave, wherein each ejector structure is configured to focus the ultrasonic pressure wave at a tip of the ejector nozzle, and wherein the first reservoir is disposed between the first actuator and the first set of ejector structures;

ionizing the first molecule in the first fluid to produce the first ionized molecule; activating the first actuator to generate the ultrasonic pressure wave for forcing the first fluid through the ejector nozzle; and ejecting the first fluid including the first ionized molecule through the ejector nozzle.

19. The method of claim 18, further comprising: focusing the ultrasonic pressure wave with the first set of ejector structures.

20. The method of claim 18, wherein the electrospray system further comprises:

a second reservoir configured to store a second fluid including a second ionizable molecule, wherein a separating layer is disposed between the first reservoir and the second reservoir, wherein the first actuator is disposed in communication with the second reservoir and is configured to generate an ultrasonic pressure wave through the second fluid;

a second ionization source configured to ionize the second ionizable molecule to form a second ionized molecule; and a second set of ejector structures including at least one ejector nozzle configured to eject the second fluid in response to the ultrasonic pressure wave, wherein each ejector structure is configured to focus the ultrasonic pressure wave at a tip of the ejector nozzle, and wherein the second reservoir is disposed between the first actuator and the second set of ejector structures; and the method further comprises:

ionizing the second ionizable molecule in the fluid to produce the second ionized molecule;

activating the first actuator to generate the ultrasonic pressure wave for forcing the second fluid through the ejector nozzle of the second set of ejector structures; and ejecting the second fluid including the second ionized molecule through the ejector nozzle of the second set of ejector structures.

21. The method of claim 20, wherein the electrospray system further comprises:

a first separating structure disposed between the first actuator and the first fluid in the first reservoir and a second separating structure disposed between the first actuator and the second fluid in the second reservoir, wherein a fluid bubble is controllably positioned in a position selected from a first position and a second position, wherein the first position is substantially between the first separating structure and the first actuator, and wherein the second position is between the second separating structure and the first actuator, positioning the fluid bubble in the first position and a gas bubble in the second position;

ionizing the first molecule in the first fluid to produce the first ionized molecule;

activating the first actuator to generate the ultrasonic pressure wave for forcing the first fluid through the ejector nozzle; and ejecting the first fluid including the first ionized molecule through the ejector nozzle, wherein the gas bubble does not effectively couple to and transmit the ultrasonic pressure wave, and wherein the fluid bubble effectively couples to and transmits the ultrasonic pressure wave to the first fluid.

22. The method of claim 21, further comprising:

positioning the fluid bubble in the second position and a gas bubble in the first position;

ionizing the second ionizable molecule in the fluid to produce the second ionized molecule;

activating the first actuator to generate the ultrasonic pressure wave for forcing the second fluid through the ejector nozzle of the second set of ejector structures; and ejecting the second fluid including the second ionized molecule through the ejector nozzle of the second set of ejector structures.

23. A method of fabricating an electrospray structure, comprising:

providing a structure;

forming a first set of ejector structures within the structure, the first set of ejector structures including at least one ejector nozzle configured to eject a first fluid in response to the ultrasonic pressure wave, wherein each ejector structure is configured to focus the ultrasonic pressure wave at a tip of the ejector nozzle; and disposing a first actuator on the structure, wherein a first space between the first actuator and the first set of ejector structures forms a first reservoir, wherein the first actuator is in communication with the first reservoir, wherein the actuator is configured to generate an ultrasonic pressure wave through a first reservoir, wherein a first ionization source is disposed on a surface selected from an inside wall of the ejector nozzle adjacent the first reservoir, the first actuator adjacent the first reservoir, and combinations thereof.

24. The method of claim 23, wherein forming includes:

forming the ejector structure in the form of a structure selected from a horn structure and a pyramidal structure.

25. The method of claim 24, further comprising:

forming the horn structure having an internal cavity that expands from a tip according to at least one function selected from a linear function and an exponential function.

26. The method of claim 23, further comprising:

forming the first ionization source on the inside wall of the ejector nozzle adjacent the first reservoir.

27. The method of claim 23, further comprising:

disposing an ejector nozzle sealing structure on the first set of ejector structures adjacent the tip of the ejector nozzle;

disposing a first fluid in the first set of ejector structures but not substantially within the first reservoir; and disposing a separating structure on the first set of ejector structures on the side opposite the ejector nozzles, wherein the separating structure is adapted to seal the first fluid within the first set of ejector structures.

28. A method, comprising:

providing an electrospray system comprising, a first reservoir configured to store a first fluid including a first ionizable molecule;

a first actuator disposed in communication with the first reservoir configured to generate an ultrasonic pressure wave through the first fluid;

an ionization source configured to ionize the first ionizable molecule to form an ionized first molecule;

a first set of ejector structures including at least one ejector nozzle configured to eject the first fluid in response to the ultrasonic pressure wave, wherein each ejector structure is configured to focus the ultrasonic pressure wave at a tip of the ejector nozzle, and wherein the first reservoir is disposed between the first actuator and the first set of ejector structures a second reservoir configured to store a second fluid including a second ionizable molecule, wherein a separating layer is disposed between the first reservoir and the second reservoir, wherein the first actuator is disposed in communication with the second reservoir and is configured to generate an ultrasonic pressure wave through the second fluid;

a second ionization source configured to ionize the second ionizable molecule to form a second ionized molecule; and a second set of ejector structures including at least one ejector nozzle configured to eject the second fluid in response to the ultrasonic pressure wave, wherein each ejector structure is configured to focus the ultrasonic pressure wave at a tip of the ejector nozzle, and wherein the second reservoir is disposed between the first actuator and the second set of ejector structures;

ionizing the first molecule in the first fluid to produce the first ionized molecule;

activating the first actuator to generate the ultrasonic pressure wave for forcing the first fluid through the ejector nozzle;

ejecting the first fluid including the first ionized molecule through the ejector nozzle;

ionizing the second ionizable molecule in the fluid to produce the second ionized molecule;

activating the first actuator to generate the ultrasonic pressure wave for forcing the second fluid through the ejector nozzle of the second set of ejector structures; and ejecting the second fluid including the second ionized molecule through the ejector nozzle of the second set of ejector structures.

29. The method of claim 28, wherein the electrospray system further comprises:

a first separating structure disposed between the first actuator and the first fluid in the first reservoir and a second separating structure disposed between the first actuator and the second fluid in the second reservoir, wherein a fluid bubble is controllably positioned in a position selected from a first position and a second position, wherein the first position is substantially between the first separating structure and the first actuator, and wherein the second position is between the second separating structure and the first actuator, positioning the fluid bubble in the first position and a gas bubble in the second position;

ionizing the first molecule in the first fluid to produce the first ionized molecule;

activating the first actuator to generate the ultrasonic pressure wave for forcing the first fluid through the ejector nozzle; and ejecting the first fluid including the first ionized molecule through the ejector nozzle, wherein the gas bubble does not effectively couple to and transmit the ultrasonic pressure wave, and wherein the fluid bubble effectively couples to and transmits the ultrasonic pressure wave to the first fluid.

30. The method of claim 29, further comprising:

positioning the fluid bubble in the second position and a gas bubble in the first position;

ionizing the second ionizable molecule in the fluid to produce the second ionized molecule;

activating the first actuator to generate the ultrasonic pressure wave for forcing the second fluid through the ejector nozzle of the second set of ejector structures; and ejecting the second fluid including the second ionized molecule through the ejector nozzle of the second set of ejector structures.

* * * * *

UNITED STATES PATENT AND TRADEMARK OFFICE

CERTIFICATE OF CORRECTION

PATENT NO. : 7,208,727 B2 
APPLICATION NO. : 10/930197
DATED : April 24, 2007
INVENTOR(S) : Fedorov et al.

It is certified that error appears in the above-identified patent and that said Letters Patent is hereby corrected as shown below:

IN THE SPECIFICATION

Column 1, line 44, delete “a” after the word “of”.

Column 1, line 66, delete “On” and replace with --One--.

Column 2, line 26, add --the-- after “to”.

Column 8, line 5, add --.-- after “thereof”.

Column 8, line 21, add --.-- after “MHz”.

Column 8, line 45, delete “.” after “)”.

Column 8, line 54, add --the-- after “in”.

Column 9, line 2, add --the-- after “in”.

Column 9, line 23, delete “to produce” and add --of producing--.

Column 9, line 33, add --.-- after “thereof”.

Column 9, line 36, add --.-- after “thereof”.

Column 10, line 40, add --.-- after “thereof”.

UNITED STATES PATENT AND TRADEMARK OFFICE

CERTIFICATE OF CORRECTION

PATENT NO. : 7,208,727 B2
APPLICATION NO. : 10/930197
DATED : April 24, 2007
INVENTOR(S) : Fedorov et al.

It is certified that error appears in the above-identified patent and that said Letters Patent is hereby corrected as shown below:

<u>IN THE SPECIFICATION (cont'd)</u>

Column 11, line 44, delete “the” after “of”.

Signed and Sealed this

Fourteenth Day of August, 2007

JON W. DUDAS
*Director of the United States Patent and Trademark Office*